United States Patent
Terashima et al.

(10) Patent No.: US 10,360,893 B2
(45) Date of Patent: Jul. 23, 2019

(54) ACTIVE VIBRATION AND NOISE CONTROL DEVICE AND ACTIVE VIBRATION AND NOISE CONTROL CIRCUIT

(71) Applicant: HONDA MOTOR CO., LTD., Minato-ku, Tokyo (JP)

(72) Inventors: Osamu Terashima, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/075,154

(22) PCT Filed: Jan. 13, 2017

(86) PCT No.: PCT/JP2017/000994
§ 371 (c)(1),
(2) Date: Aug. 3, 2018

(87) PCT Pub. No.: WO2017/135013
PCT Pub. Date: Aug. 10, 2017

(65) Prior Publication Data
US 2019/0043470 A1    Feb. 7, 2019

(30) Foreign Application Priority Data
Feb. 5, 2016    (JP) .................................. 2016-020635

(51) Int. Cl.
*G10K 11/16*    (2006.01)
*H04R 3/00*    (2006.01)
(Continued)

(52) U.S. Cl.
CPC .......... *G10K 11/1781* (2018.01); *B60R 11/02* (2013.01); *G10K 11/178* (2013.01);
(Continued)

(58) Field of Classification Search
CPC .. G10K 11/16; G10K 11/178; G10K 11/1781; G10K 11/1786; G10K 11/1788;
(Continued)

(56) References Cited

U.S. PATENT DOCUMENTS 5,499,302 A * 3/1996 Nagami ............... G10K 11/178
 381/71.4
6,845,162 B1 * 1/2005 Emborg ............... G10K 11/178
 381/71.4
(Continued)

FOREIGN PATENT DOCUMENTS

| JP | 07-104767 | 4/1995 |
|----|-----------|--------|
| JP | 10-214119 | 8/1998 |
| JP | 2009-292201 | 12/2009 |

OTHER PUBLICATIONS

International Search Report and Written Opinion for International Application No. PCT/JP2017/000994 dated Feb. 28, 2017, 8 pages.

*Primary Examiner* — Thang V Tran
(74) *Attorney, Agent, or Firm* — Amin, Turocy & Watson LLP

(57) ABSTRACT

An active vibration and noise control device robust against outside disturbances, and an active vibration and noise control circuit are provided. An adaptive control circuit of this active vibration and noise control device has a cross-correlation value calculation unit which calculates the cross-correlation value of error signals, and a canceling output limiting unit which determines whether or not the cross-correlation value is less than a cross-correlation threshold value, and limits increases in the cancelling output if it is determined that the cross-correlation value is less than the cross-correlation threshold value.

13 Claims, 11 Drawing Sheets

(51) Int. Cl.
  *B60R 11/02* (2006.01)
  *G10K 11/178* (2006.01)

(52) U.S. Cl.
  CPC .............. *G10K 2210/12821* (2013.01); *G10K 2210/3028* (2013.01)

(58) Field of Classification Search
  CPC ......... G10K 11/1784; G10K 2210/121; G10K 2210/1282; G10K 2210/12821; G10K 2210/129; G10K 2210/511; G10K 2210/3019; G10K 2210/3028; H04R 3/00; H04R 3/005; H04R 3/04; H04R 3/14; B60R 11/02; B60R 11/0217

See application file for complete search history.

(56) References Cited

U.S. PATENT DOCUMENTS

| | | | |
|---|---|---|---|
| 7,792,312 B2* | 9/2010 | Inoue | G10K 11/1782 381/71.14 |
| 2005/0053244 A1* | 3/2005 | Onishi | G10K 11/17883 381/71.11 |
| 2008/0152158 A1* | 6/2008 | Sakamoto | G10K 11/178 381/71.4 |
| 2008/0240456 A1* | 10/2008 | Sakamoto | G10K 11/178 381/71.4 |
| 2009/0060217 A1 | 3/2009 | Sakamoto et al. | |
| 2010/0195844 A1* | 8/2010 | Christoph | G10K 11/178 381/71.11 |
| 2011/0123042 A1 | 5/2011 | Sakamoto et al. | |
| 2012/0032619 A1 | 2/2012 | Kobayashi et al. | |
| 2012/0033821 A1* | 2/2012 | Ohta | G10K 11/17854 381/71.1 |
| 2013/0315409 A1* | 11/2013 | Inoue | G10K 11/17833 381/71.1 |

* cited by examiner

ACTIVE VIBRATION AND NOISE CONTROL DEVICE AND ACTIVE VIBRATION AND NOISE CONTROL CIRCUIT

TECHNICAL FIELD

The present invention relates to an active vibration noise control apparatus and an active vibration noise control circuit that generate canceling output corresponding to a target noise or a canceling output corresponding to a target vibration to cancel a target noise or a target vibration. More particularly, the present invention relates to an active vibration noise control apparatus and an active vibration noise control circuit that cancels the target noise or the target vibration by using a so-called adaptive control.

BACKGROUND ART

As an apparatus for suppressing vibration noise in the passenger compartment, an active noise control apparatus (hereinafter referred to as "ANC apparatus") has been known. Further, as an apparatus for suppressing vibration itself or vibration noise in the vehicle interior, an active vibration control apparatus (hereinafter referred to as "AVC apparatus") has been known.

In a general ANC apparatus, the target noise is reduced by outputting from the speaker in the vehicle interior an antiphase canceling sound with respect to the target noise. The error between the target noise and the canceling sound is detected as residual noise by a microphone disposed in the vicinity of the ear of the occupant, and is used for subsequent determination of canceling sound. The ANC apparatus may reduce, for example, vehicle interior noise (engine muffled sound) in response to engine vibration or vehicle interior noise (road noise) caused by the wheels of a moving vehicle in contact with the road surface (see, for example, Japanese Laid-Open Patent Publication No. 07-104767 (hereinafter referred to as "JP 07-104767 A") and U.S. Patent Application Publication No. 2009/0060217 (hereinafter referred to as "US 2009/0060217 A1") reference).

In a general AVC apparatus, vibration generated in opposite phase to the target vibration is generated by an actuator, thereby reducing the target vibrations transmitted to the vehicle interior. The error between the target vibration and the canceling vibration is detected as a residual vibration by a vibration sensor disposed in the vicinity of the actuator, and it is used to determine subsequent canceling vibration. For example, the AVC apparatus suppresses transmission of engine vibration to the vehicle interior (see, for example, U.S. Patent Application Publication No. 2012/0032619 (hereinafter referred to as "US 2012/0032619 A1")).

In JP 07-104767 A and US 2009/0060217 A1, an adaptive control is used to generate a canceling sound. More specifically, in JP 07-104767 A, the first basic signal X1 based on the engine speed [rpm] is multiplied by the filter weight Wim in the first adaptive filter group 32 to generate the speaker drive signal Yim (FIG. 1, [0018]). As a result, the engine noise is reduced. The filter weight Wim is calculated based on the first basic signal X1 and the detection signal e1 from the microphone 40 ((0021)). Further, similar controls are also carried out for road noise (vibration detected by the input vibration detection unit 18) and wind noise (sound pressure detected by the input sound pressure detection unit 24) ([0022]).

Also, in US 2009/0060217 A1, the first basic signal generator 31 generates a first basic signal Sr1 synchronized with the road noise frequency fd (FIG. 1, [0042]). The first adaptive filter 36 generates a first control signal SC1 from the first basic signal Sr1 (FIG. 1, [0042]). The filter coefficient W1 used in the first adaptive filter 36 is set by the filter coefficient updating unit 38 ([0042], [0043]).

The filter coefficient updating unit 38 calculates the filter coefficient W1 based on the reference signal r from the reference signal generation unit 34, the error signal ea from the microphone 22, etc. ([0042]). The reference signal generation unit 34 calculates the reference signal r based on the simulated transfer characteristic $\hat{C}$ ([0042]).

In US 2012/0032619 A1, the canceling vibration is generated using an adaptive control. Specifically, the frequency identifying unit 83a (FIG. 6) identifies the frequency of engine vibration in the vibration mode of the maximum amplitude based on the TDC pulse signal and the CRK pulse signal ([0120]). The basic signal generation unit 83b generates a basic signal based on the frequency identified by the frequency identification unit 83a ([0121]). The adaptive filter unit 83d generates an optimal cancellation signal based on the calculation result (filter coefficient) of the least squares calculation unit 83c ([0129]). The least squares calculation unit 83c calculates an optimal cancellation signal based on input signals from the basic signal generation unit 83b and the vibration sensor 29 ([0126] to [0129]).

The drive control unit 83e outputs an output signal based on an input signal from the adaptive filter unit 83d to the drive circuit 53A ([0130], [0131]). The drive circuit 53A drives the actuator 30 based on an input signal from the drive control unit 83e ([0075]).

SUMMARY OF INVENTION

As described above, in the ANC apparatus and the AVC apparatus (hereinafter, both are collectively referred to as "active vibration noise control apparatus", the filter coefficient of the adaptive filter is calculated (or updated) based on the reference signal (or the basic signal) and the error signal. In the calculation of the filter coefficient, when the error signal involves disturbance, divergence of control or unintended canceling sound or vibration (hereinafter, both are collectively referred to as "canceling output") may occur. JP 07-104767 A, US 2009/0060217 A1 and US 2012/0032619 A1 do not study this point.

An object of the present invention is to provide an active vibration noise control apparatus and an active vibration noise control circuit that are robust against disturbance, which has been made in view of the above problem.

An active vibration noise control apparatus according to the present invention comprises: a basic signal generating unit configured to output a basic signal indicating a target input which is a target noise or a target vibration; an adaptive control circuit configured to perform an adaptive control on the basic signal to output a control signal; a canceling output generation unit configured to generate a canceling output as a canceling sound for the target noise or a canceling vibration for the target vibration based on the control signal; a first error detecting unit configured to detect a first error as a difference between the canceling output and the target input at a first evaluation point and output a first error signal; and a second error detecting unit configured to detect a second error as a difference between the canceling output and the target input at a second evaluation point and output a second error signal, wherein the adaptive control circuit comprises: an adaptive filter configured to generate the control signal on a basis of the basic signal or the reference signal based on the basic signal; a filter coefficient calculation unit configured to calculate a filter coefficient of the adaptive filter based on the basic signal or the reference signal and at least one of the first error signal and the second error signal; a cross-correlation value calculation unit configured to calculate a cross-correlation value between the first error signal and the second error signal; and a canceling output limiting unit configured to determine whether or not the cross-correlation value is smaller than a cross-correlation threshold value, and limit an increase in the canceling output in a case where it is determined that the cross-correlation value is smaller than the cross-correlation threshold value.

According to the present invention, in a case where it is determined that the cross-correlation value between the first error signal and the second error signal is lower than the cross-correlation threshold value, the increase in the canceling output is limited. As a result, when the influence of the disturbance entering the first error signal or the second error signal is large, the divergence of control or the occurrence of an unintended canceling output can be prevented by limiting the increase in the canceling output (canceling sound or canceling vibration).

The cross-correlation value calculation unit may calculate the cross-correlation value in a case where the frequencies of the first error signal and the second error signal are higher than an allowable lowest frequency. In addition, the cross-correlation value calculation unit may not calculate the cross-correlation value in a case where the frequency of the first error signal or the second error signal is lower than the allowable lowest frequency.

In a case where the frequency of the first error signal or the second error signal is relatively low, the variation of the cross-correlation value tends to be large. Therefore, in a case where the frequency of the first error signal or the second error signal is relatively low, it is possible to limit the increase in the canceling output at an appropriate situation by not calculating the cross-correlation value.

The cross-correlation value calculation unit may acquire the vehicle speed of the vehicle in which the active vibration noise control apparatus is disposed, and may switch the allowable lowest frequency according to the vehicle speed. Thus, by switching the use of the cross-correlation value according to the vehicle speed, it is possible to suppress the increase of the filter coefficient at an appropriate situation.

The adaptive control circuit determines whether or not the amplitudes of the first error signal and the second error signal are greater than an amplitude threshold value, and may limit an increase in the filter coefficient regardless of whether the cross-correlation value exceeds the cross-correlation threshold value or not in a case where the amplitudes of the first error signal and the second error signal are greater than an amplitude threshold value. In this manner, in a case where the amplitude of the first error signal or the second error signal becomes excessively large, the divergence of the control or the occurrence of an unintended canceling output (canceling sound or canceling vibration) can be prevented by limiting the increase of the filter coefficient.

The adaptive control circuit may calculate differences between a previous effective value and a current effective value of the first error signal and the second error signal, and determine whether or not the differences between the effective values exceed a difference threshold value. The adaptive control circuit may limit an increase in the filter coefficient regardless of whether the cross-correlation value exceeds the cross-correlation threshold value or not in a case where the differences between the effective values exceed the difference threshold value. In this manner, in a case where the amplitude of the first error signal or the second error signal becomes excessively large, the divergence of the control or the occurrence of an unintended canceling output (canceling sound or canceling vibration) can be prevented by limiting the increase of the filter coefficient.

The adaptive control circuit may acquire an air volume of an air conditioner of the vehicle in which the active vibration noise control apparatus is disposed, and determine whether the air volume exceeds an air volume threshold value. Then, in a case where the air volume exceeds the air volume threshold value, the adaptive control circuit may limit the increase of the filter coefficient regardless of whether or not the cross-correlation value exceeds the cross-correlation threshold value. In this manner, in a case where the air volume of the air conditioner becomes excessively large, the divergence of the control or the occurrence of an unintended canceling output (canceling sound or canceling vibration) can be prevented by limiting the increase of the filter coefficient.

The adaptive control circuit specifies whether or not a window of a vehicle in which the active vibration noise control apparatus is disposed is in an open state, and if the window is in the open state, the adaptive control circuit may limit the increase of the filter coefficient regardless of whether or not the cross-correlation value exceeds the cross-correlation threshold value. Thus, when the window of the vehicle is in the open state, the divergence of the control or the occurrence of an unintended canceling output (canceling sound or canceling vibration) can be prevented by limiting the increase of the filter coefficient.

The cross-correlation value calculation unit may set a window length of a window function that specifies an extraction portion for calculating the cross-correlation value from the first error signal and the second error signal, and calculate the cross-correlation value with respect to the extracted portion specified by using the window length. Further, the cross-correlation value calculation unit may obtain the rotational speed of the running drive source of the vehicle in which the active vibration noise control apparatus is disposed, and change the window length of the window function according to the rotational speed of the running drive source.

Thus, the range of the extracted portion of the first error signal and the second error signal used for calculating the cross-correlation value is changed in accordance with the rotational speed of the running driving source (engine, traction motor, etc.). When the rotational speed of the running drive source is high, the main components of the first error signal and the second error signal are high-frequency components. In this case, for example, by shortening the window length of the window function, it is possible to shorten the calculation cycle of the cross-correlation value or to improve the detection accuracy of the cross-correlation value (since the influence of the low frequency component becomes small).

The cross-correlation value calculation unit may estimate the frequency of the first error signal and the second error signal based on the rotational speed of the running drive source, and set the reciprocal of the estimated frequency as the window length of the window function. This makes it possible to set the window length of the window function by a relatively simple method.

In a case where the first error detection unit and the second error detection unit are microphones, the adaptive control circuit may determine whether or not the voice recognition device of the vehicle where the active vibration noise control apparatus is disposed is performing voice recognition. In a case where the voice recognition device is performing the voice recognition, the adaptive control circuit may allow an increase in the filter coefficient regardless of whether or not the cross-correlation value falls below the cross-correlation threshold value.

As a result, even when a disturbance occurs in the first error signal or the second error signal in accordance with the voice input to the microphone, the generation of the canceling output (canceling sound or canceling vibration) is continued. Therefore, it is possible to prevent the difficulty of voice recognition by restricting an increase in canceling output during voice recognition.

The canceling output limiting unit may determine whether or not the cross-correlation value falls below the cross-correlation threshold value at every predetermined period, and may count the number of times that the cross-correlation value falls below the cross-correlation threshold. In addition, the canceling output limiting unit may limit the increase in the canceling output when the number of times reaches the threshold number of times. This makes it possible to increase the reliability of the determination that the cross-correlation value of the target signal (error signal or reference or basic signal) is lower than the cross-correlation threshold.

The adaptive control circuit may obtain a voltage to be applied to a motor that drives a fan of an air conditioner of a vehicle in which the active vibration noise control apparatus is disposed. The adaptive control circuit may determine whether the applied voltage exceeds a voltage threshold. The adaptive control circuit may limit an increase in the filter coefficient regardless of whether the cross-correlation value exceeds the cross-correlation threshold, if the applied voltage exceeds the voltage threshold. Thus, when the air volume of the air conditioner becomes excessively large, it is possible to prevent divergence of control or occurrence of unintentional canceling sound by limiting an increase in filter coefficient.

An active vibration noise control circuit according to the present invention configured to receive a basic signal indicating a target input that is a target noise or a target vibration from a basic signal generating unit; generate a control signal indicating a canceling output as a canceling sound relative to the target noise or a canceling vibration relative to the target vibration by performing an adaptive control on the basic signal; and output the control signal to a canceling output generating unit configured to generate the canceling output, wherein the active vibration noise control circuit comprises: an adaptive filter configured to generate the control signal on a basis of the basic signal or the reference signal based on the basic signal; a filter coefficient calculation unit configured to receive, from a first error detection unit, a first error signal indicative of a first error as a difference between the canceling output and the target input at a first evaluation point, receive, from a second error detection unit, a second error signal indicative of a second error as a difference between the canceling output and the target input at a second evaluation point, and calculate a filter coefficient of the adaptive filter based on the reference or basic signal and at least one of the first error signal and the second error signal; a cross-correlation value calculation unit configured to calculate a cross-correlation value between the first error signal and the second error signal; and a canceling output limiting unit configured to limit an increase in the canceling output in a case where it is determined that the cross-correlation value is lower than the cross correlation threshold value.

According to the present invention, it is robust against disturbance.

DESCRIPTION OF EMBODIMENTS

A. First Embodiment

<A-1. Configuration of First Embodiment>
[A-1-1. Overall Configuration]

Figure 1:
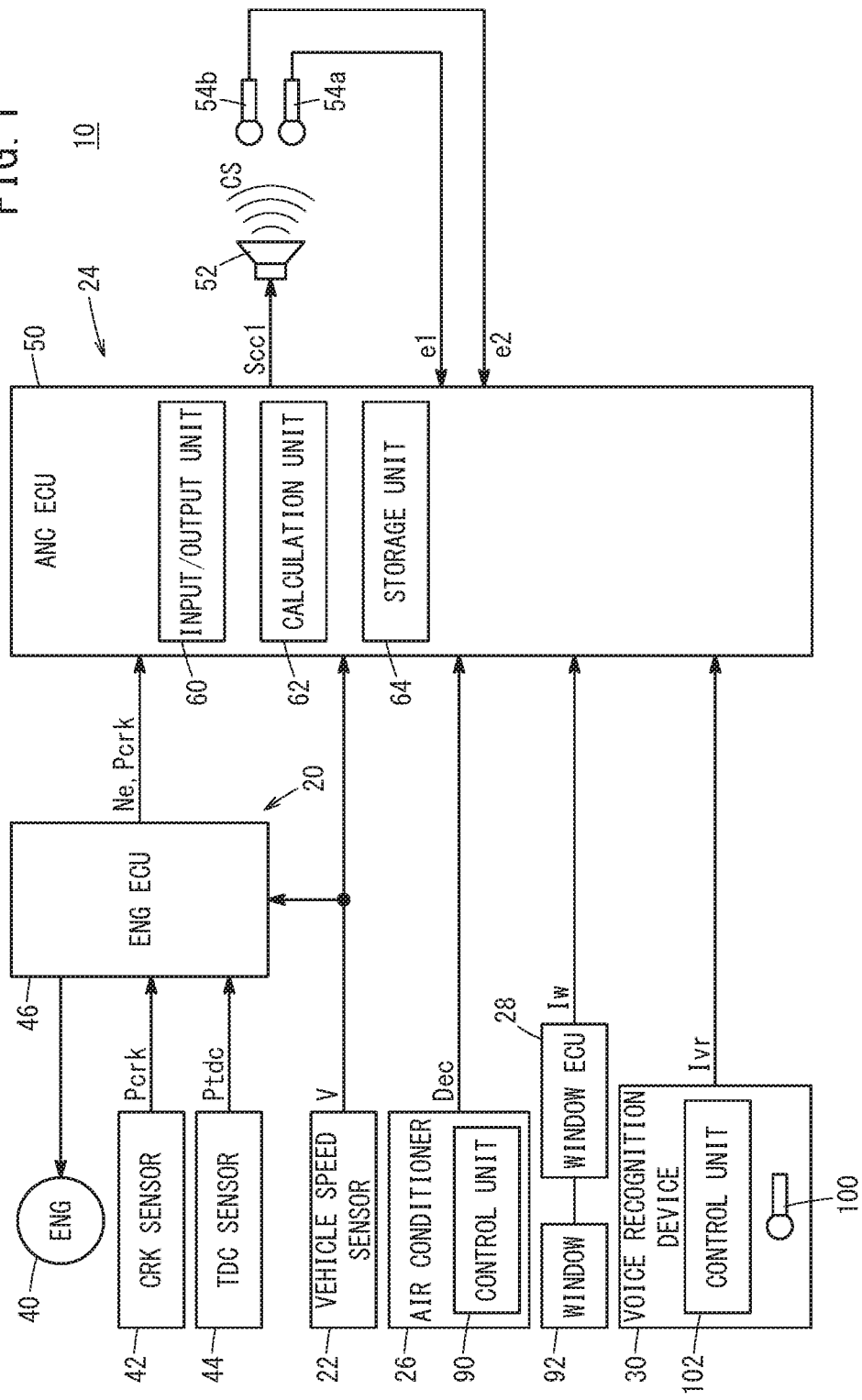
FIG. 1 is a diagram showing a schematic configuration of a vehicle equipped with an active noise control apparatus as an active vibration noise control apparatus according to a first embodiment of the present invention.

FIG. 1 shows an active noise control apparatus 24 (hereinafter referred to as "ANC apparatus 24") as an active vibration noise control apparatus according to a first embodiment of the present invention. FIG. 1 is a diagram showing a schematic configuration of a vehicle 10 on which a vehicle is mounted. The vehicle 10 includes, in addition to the ANC apparatus 24, an engine unit 20, a vehicle speed sensor 22, an air conditioner 26, a window electronic control unit 28 (hereinafter referred to as "window ECU 28"), and a voice recognition device 30.

[A-1-2. Engine Unit 20 and Vehicle Speed Sensor 22]

The engine unit 20 includes an engine 40, a crank pulse sensor 42 (hereinafter referred to as "CRK sensor 42"), a top dead center sensor 44 (hereinafter referred to as "TDC sensor 44"), an engine electronic control unit 46 (hereinafter referred to as "engine ECU 46" or "ENG ECU 46").

The CRK sensor 42 (basic signal generating unit) outputs to the engine ECU 46 a crank pulse Pcrk (hereinafter also referred to as "CRK pulse Pcrk") corresponding to the rotational angle of a crankshaft (not shown) of the engine 40. The TDC sensor 44 outputs to the engine ECU 46 a top dead center pulse Ptdc (hereinafter also referred to as "TDC pulse Ptdc") corresponding to the top dead center of each piston (not shown) of the engine 40.

If the output of the CRK sensor 42 and/or the TDC sensor 44 is analog, an analog/digital converter is provided between the CRK sensor 42 and/or the TDC sensor 44 and the engine ECU 46. As a result, digital values are input to the engine ECU 46.

The engine ECU 46 controls the output of the engine 40 based on the CRK pulse Pcrk, the TDC pulse Ptdc, the vehicle speed V, and the like. Further, the engine ECU 46 calculates the rotational speed Ne of the engine 40 per unit time (hereinafter also referred to as "rotational speed Ne") [Rpm] based on the CRK pulse Pcrk, and transmits it to the ANC apparatus 24. The vehicle speed sensor 22 detects the vehicle speed V of the vehicle 10 and outputs it to the engine ECU 46, the ANC apparatus 24, and the like.

[A-1-3. ANC Apparatus 24]

(A-1-3-1. Overview)

The ANC apparatus 24 outputs a canceling vibration CS with respect to a vibration noise VN (hereinafter also referred to as "noise VN") accompanying the operation of the engine 40, thereby canceling the noise VN at specific evaluation points (the first evaluation point and the second evaluation point). The evaluation point here can be, for example, the driver's ear position or overhead. As shown in FIG. 1, the ANC apparatus 24 includes an active noise control electronic control unit 50 (hereinafter referred to as "ANC ECU 50").), a speaker 52, and microphones 54a, 54b. Hereinafter, the microphone 54a is also referred to as a first microphone 54a, and the microphone 54b is also referred to as a second microphone 54b.

(A-1-3-2. ANC ECU 50)

(A-1-3-2-1. Outline of ANC ECU 50)

The ANC ECU 50 (adaptive control circuit, active vibration noise control circuit) generates a combined control signal Scc1 by performing so-called adaptive control on a crank pulse Pcrk (engine signal). The synthesized control signal Scc1 indicates the canceling sound CS in accordance with the rotation of the engine 40. As shown in FIG. 1, the ANC ECU 50 includes an input/output unit 60, a calculation unit 62, and a storage unit 64 as hardware. Except for the configuration peculiar to the present invention (the cross-correlation value calculating unit 76, the output switching unit 78 and the like which will be described later), the basic configuration of the ANC ECU 50 is the same as the configuration of the conventional ANC ECU (for example, those disclosed in JP 07-104767 A or US 2009/0060217 A1) can be used.

(A-1-3-2-2. Input/Output Unit 60)

The input/output unit 60 inputs and outputs signals between the ANC ECU 50 and external devices (the vehicle speed sensor 22, the air conditioner 26, etc.).

(A-1-3-2-3. Calculation Unit 62)

(A-1-3-2-3-1. Outline of Calculation Unit 62)

The calculation unit 62 includes a central processing unit (CPU) (not shown) and controls the entire ANC apparatus 24 by executing a program stored in the storage unit 64. A part of the program may be replaced with an electric circuit or an electronic circuit as hardware.

Figure 2:
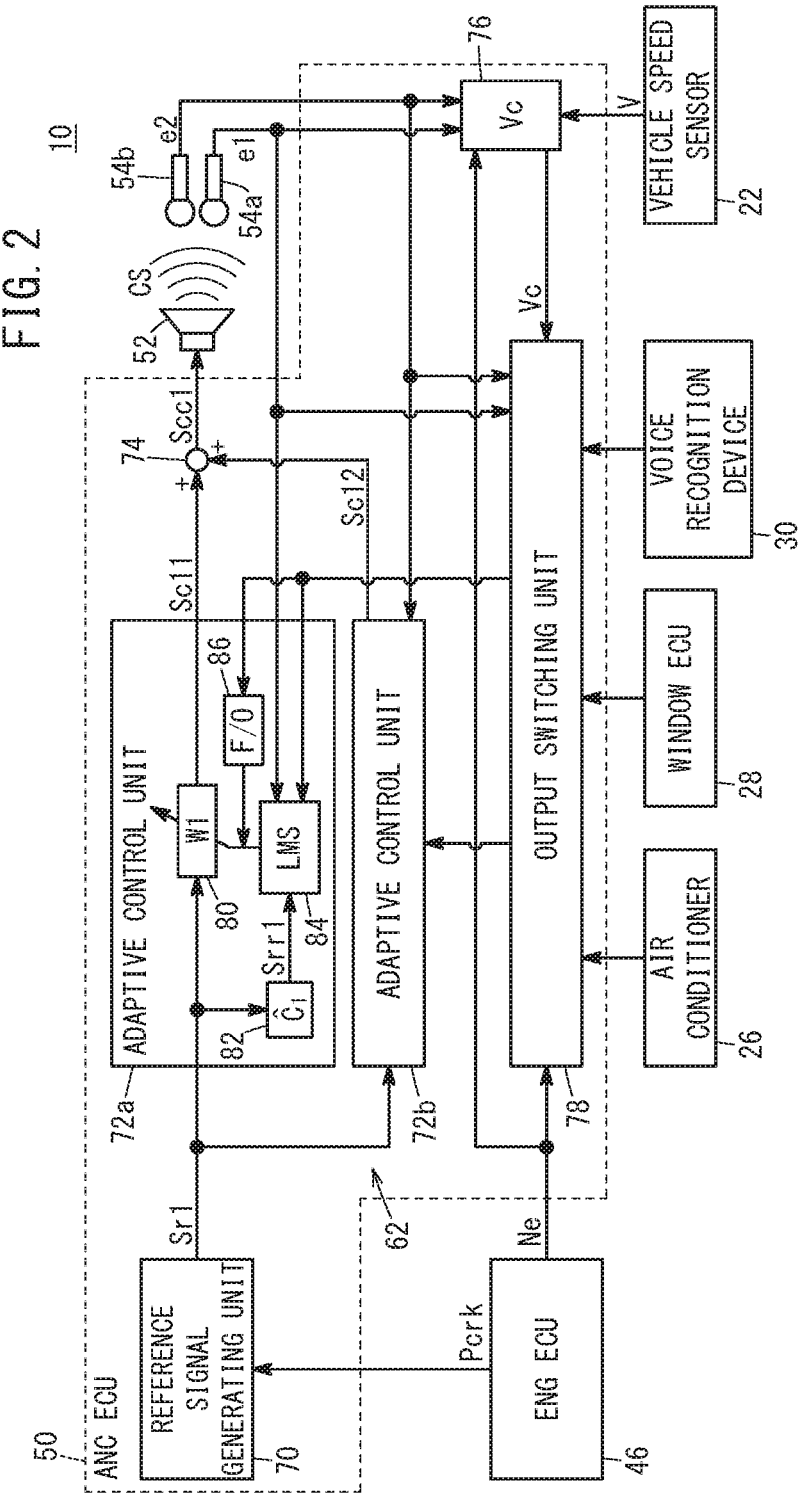
FIG. 2 is a block diagram showing a calculation unit and its periphery of an electronic control unit of the active noise control in the first embodiment.

FIG. 2 is a block diagram showing the calculation unit 62 and the periphery of the ANC ECU 50 according to the first embodiment. As shown in FIG. 2, the calculation unit 62 includes a reference signal generation unit 70, adaptive control units 72a, 72b, an adder 74, a cross-correlation value calculation unit 76, and an output switching unit 78.

(A-1-3-2-3-2. Reference Signal Generating Unit 70)

The reference signal generating unit 70 generates the reference signal Sr1 based on the CRK pulse Pcrk as the reference signal, and outputs it to the adaptive control units 72a, 72b.

(A-1-3-2-3-3. Adaptive Control Units 72a, 72b)

As shown in FIG. 2, the adaptive control unit 72a includes an adaptive filter 80, a reference signal correcting unit 82, a filter coefficient calculation unit 84, and a fade-out processing unit 86. Although not shown in FIG. 2, the adaptive control unit 72b also has the same configuration as the adaptive control unit 72a.

The adaptive filter 80 is, for example, a FIR (Finite Impulse Response) type or adaptive notch type filter. The adaptive filter 80 of the adaptive control unit 72a performs adaptive filter processing using the filter coefficient W1 on the reference signal Sr1 and outputs the control signal Sc11. Similarly, the adaptive filter 80 of the adaptive control unit 72b outputs the control signal Sc12.

The reference signal correcting unit 82 generates a correction reference signal Srr1 by performing a transfer function process on the reference signal Sr1. The correction reference signal Srr1 is used in calculating the filter coefficient W1 in the filter coefficient calculation unit 84. The transfer function process is a process of correcting the reference signal Sr1 based on the transfer function $C_1\hat{}$ (filter coefficient) of the canceling sound CS from the speaker 52 to the first microphone 54a. The transfer function $C_1\hat{}$ used in this transfer function processing is a measured value or predicted value of the actual transfer function $C_1$ of the canceling sound CS from the speaker 52 to the first microphone 54a.

A filter coefficient calculation unit 84 (hereinafter also referred to as "calculation unit 84") sequentially calculates and updates the filter coefficient W1. The calculation unit 84 calculates the filter coefficient W1 by using an adaptive algorithm operation {for example, least squares method (LMS) algorithm operation}. In other words, based on the correction reference signal Srr1 from the reference signal correcting unit 82 and the first error signal e1 (hereinafter also referred to as "error signal e1") from the first microphone 54a, the calculation unit 84 calculates the filter coefficient W1 so that the square $(e1)^2$ of the error signal e1 is zero. A specific calculation in the filter coefficient calculation unit 84 can be performed in the same manner as in JP 07-104767 A or US 2009/0060217 A1, for example.

The fade-out processing unit 86 performs fade-out processing based on a command from the output switching unit 78. The fade-out process is a process of gradually decreasing the filter coefficient W1 of the adaptive filter 80 and stopping the output of the canceling sound CS.

Although the internal configuration of the adaptive control unit 72b is not shown in FIG. 2, the adaptive control unit 72b has the same configuration as the adaptive control unit 72a. However, the adaptive control unit 72a uses the first error signal e1 from the first microphone 54a, whereas the adaptive control unit 72b uses the second error signal e2 (hereinafter also referred to as "error signal e2") from the second microphone 54b is used. Then, the adaptive control unit 72b outputs the control signal Sc12 based on the reference signal Sr1 and the error signal e2.

(A-1-3-2-3-4. Adder 74)

The adder 74 adds the control signal Sc11 from the adaptive control unit 72a and the control signal Sc12 from the adaptive control unit 72b to generate a combined control signal Scc1.

(A-1-3-2-3-5. Cross-Correlation Value Calculation Unit 76)

The cross-correlation value calculation unit 76 (hereinafter also referred to as "calculation unit 76") outputs the cross-correlation value Vc (hereinafter also referred to as "correlation value Vc") between the first error signal e1 and the second error signal e2 to the output switching unit 78. Calculation of the correlation value Vc is performed using the following equation (1).

$$Vc(t) = \lim_{T \to n} \frac{1}{T} \int_0^T Cc(t)dt \quad (1)$$

In the equation (1), T represents the sampling number, and n represents a specific natural number (for example, any one of 10 to 1000). Alternatively, instead of equation (1), equation (3) to be described later may be used. The value Cc is defined by the following equation (2).

$$Cc(t) = fsm1(t) \times fsm2(t) \quad (2)$$

In the equation (2), fsm1 is the frequency [Hz] of the first error signal e1, and fsm2 is the frequency [Hz] of the second error signal e2. Also, t indicates a certain point in time.

Further details regarding the calculation of the cross-correlation value Vc will be described later with reference to FIG. 3.

(A-1-3-2-3-6. Output Switching Unit 78)

The output switching unit 78 (canceling output limiting unit) switches the output of the canceling sound CS based on various kinds of information. The information here includes the cross-correlation value Vc, information of the first error signal e1 (difference ΔVef1 between the amplitude AS1 and the effective value Vef1), information of the second error signal e2 (difference ΔVef2 of the amplitude AS2 and the effective value Vef2), the air volume Dec of the air conditioner 26, the opening and closing state of the window 92, and the operation state of the voice recognition device 30. Details of the operation of the output switching unit 78 will be described later with reference to FIG. 4.

(A-1-3-2-4. Storage Unit 64)

The storage unit 64 has a nonvolatile memory and a volatile memory, and stores programs and data used by the calculation unit 62.

(A-1-3-3. Speaker 52)

The speaker 52 (canceling output generating unit) outputs a canceling sound CS corresponding to the combined control signal Scc1 from the ANC apparatus 24. As a result, a silencing effect of the vibration noise VN (engine noise) as an input to be canceled is obtained. Although only one speaker 52 is shown in FIGS. 1 and 2, this is for the purpose of facilitating understanding of the invention, and it is also possible to use a plurality of speakers 52 according to the use of the ANC apparatus 24. In that case, the number of other constituent elements may be appropriately changed.

(A-1-3-4. The First Microphone 54a and the Second Microphone 54b)

The microphones 54a, 54b (first error detection unit, second error detection unit) detect an error (the first error, the second error) of a difference between the canceling sound CS and the vibration noise VN (engine noise) as a residual noise, and outputs error signals e1, e2 indicating the residual noise to the ANC apparatus 24.

In the first embodiment, the microphones 54a, 54b are arranged side by side above the driver's head. Alternatively, the microphone 54a and the microphone 54b may be disposed at different positions. When arranging the microphones 54a, 54b close to each other, it is possible to use a common value for the transfer function $C_1\hat{\ }$ from the speaker 52 to the microphones 54a, 54b. When arranging the microphones 54a, 54b apart from each other, it is possible to separately set the transfer function $C_1\hat{\ }$ from the speaker 52 to the microphone 54a and the transfer function $C_1\hat{\ }$ from the speaker 52 to the microphone 54b.

[A-1-4. Air Conditioner 26]

The air conditioner 26 controls (cools or warms) the air in response to the operation by an occupant (including a driver) of the vehicle 10. The air conditioner 26 has a control unit 90 (FIG. 1) for controlling the air condition. The control unit 90 notifies the output switching unit 78 of the ANC ECU 50 of the air volume Dec [%] of the air conditioner 26.

In addition, the control unit 90 of the air conditioner 26 may include an automatic air blowing control unit (not shown) for automatically controlling the amount of the air blown by the air conditioner 26 so as to enable proper blowing regardless of the occupant's operation.

[A-1-5. Window ECU 28]

The window ECU 28 controls the opening and closing of the window 92 in response to the operation by the occupant (including the driver) of the vehicle 10. The window ECU 28 transmits the window information Iw indicating the opening/closing state of the window 92 to the output switching unit 78 of the ANC ECU 50.

[A-1-6. Voice Recognition Device 30]

The voice recognition device 30 recognizes a voice of an occupant (including a driver). The voice recognized by the voice recognition device 30 is used in a navigation device or the like (not shown). The voice recognition device 30 has a microphone 100 and a control unit 102. The microphone 100 may be common to the microphone 54a or 54b. The voice recognition device 30 transmits the voice recognition information Ivr indicating its own operating state (whether voice recognition is in progress) to the output switching unit 78 of the ANC ECU 50.

<A-2. Various Controls of the First Embodiment>

[A-2-1. Cross-Correlation Value Calculation Control]

Figure 3:
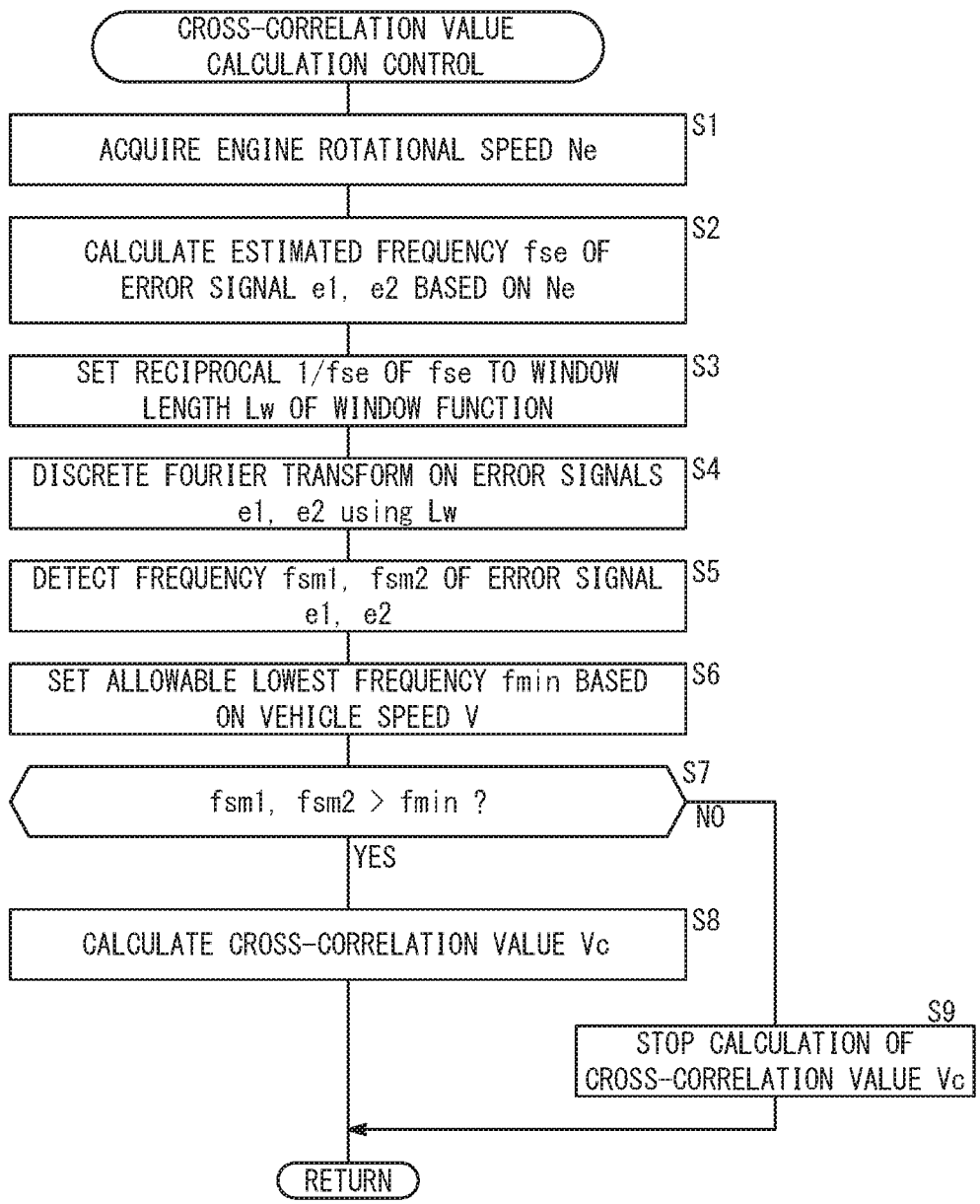
FIG. 3 is a flowchart of cross-correlation value calculation control according to the first embodiment.

FIG. 3 is a flowchart of a cross-correlation value calculation control according to the first embodiment. The cross-correlation value calculation control is a control to calculate the cross-correlation value Vc of the error signals e1, e2 (target signal).

The cross-correlation value calculation unit 76 executes the cross-correlation value calculation control. The process in FIG. 3 is executed every predetermined calculation cycle.

In step S1 of FIG. 3, the cross-correlation value calculation unit 76 acquires the engine rotational speed Ne per unit time (engine rotational speed Ne) [rpm] from the engine ECU 46. In step S2, the calculating unit 76 calculates the estimated frequency fse (hereinafter also referred to as "estimated frequency fse") [Hz] of the frequencies fsm1, fsm2 of the error signals e1, e2 based on the engine speed Ne. As the engine speed Ne increases, the estimated frequency fse increases. In step S3, the calculating unit 76 calculates the reciprocal 1/fse of the estimated frequency fse, and sets the reciprocal 1/fse as the window length Lw of the window function WF.

In step S4, the cross-correlation value calculation unit 76 performs the discrete Fourier transform on the error signals e1, e2. At this time, the calculating unit 76 uses the window length Lw of the window function WF set in step S3. In step S5, the calculating unit 76 detects the frequencies fsm1, fsm2 of the error signals e1, e2 subjected to the discrete Fourier transform. Hereinafter, the frequencies fsm1, fsm2 are also referred to as detected frequencies fsm1, fsm2.

In step S6, the calculation unit 76 sets the allowable lowest frequency f min based on the vehicle speed V. The allowable lowest frequency f min is the lowest value of the frequency fsm that allows calculation of the cross-correlation value Vc. For example, the calculation unit 76 sets the allowable lowest frequency f min higher as the vehicle speed V becomes higher.

In step S7, the calculating unit 76 determines whether or not each of the detected frequencies fsm1, fsm2 in step S5 exceeds the allowable lowest frequency f min. When the detected frequencies fsm1, fsm2 are higher than the allowable lowest frequency f min (S7: YES), the cross-correlation value Vc calculated from the detected frequencies fsm1, fsm2 can be said to be relatively reliable. Therefore, in step S8, the calculation unit 76 calculates the cross-correlation value Vc based on the n detected frequencies fsm1, fsm2 including the current value. As described above, the cross-correlation value Vc is calculated using the above equation (1). The calculation unit 76 transmits the calculated cross-correlation value Vc to the output switching unit 78.

If the distance L1 from the speaker 52 to the first microphone 54a is different from the distance L2 from the speaker 52 to the second microphone 54b, phase shifting occurs in the error signals e1, e2. In that case, a delay Z may be set to one or both of the error signals e1, e2 so that the phases of the error signals e1, e2 are brought into phase with each other.

Regarding the calculation of the cross-correlation value Vc (equations (1) and (2)), when the microphones 54a, 54b are operating normally, there is a correlation between the frequency fsm1(t) and the frequency fsm2(t). In this case, the cross-correlation value Vc (equation (1)) as a time average of the product of the frequency fsm1(t) and the frequency fsm2(t) is a value away from zero.

On the other hand, when random (or disordered) signals (that is, disturbances) are generated in one of the microphones 54a, 54b, the product of the frequency fsm1(t) and the frequency fsm2(t) is randomly a positive or negative value around zero. In this case, the cross-correlation value Vc (expression (1)) as the time average of the product of the frequency fsm1(t) and the frequency fsm2(t) is a value approaching zero. Therefore, based on the cross-correlation value Vc, occurrence of a disturbance (including abnormality of either one of microphones 54a, 54b) can be detected or estimated. The disturbance may be caused by disconnection of one of the microphones 54a, 54b, occurrence of wind sound, and the like.

Returning to step S7 in FIG. 3, if the detection frequency fsm1 or fsm2 does not exceed the allowable lowest frequency f min (S7: NO), the cross-correlation value Vc calculated from the detected frequencies fsm1, fsm2 may be a value with a relatively low reliability. Therefore, in step S9, the calculation unit 76 stops calculating the cross-correlation value Vc. In this case, the calculating unit 76 may output a fixed value close to zero or zero as the cross-correlation value Vc.

[A-2-2. Canceling Sound Output Switching Control]

Figure 4:
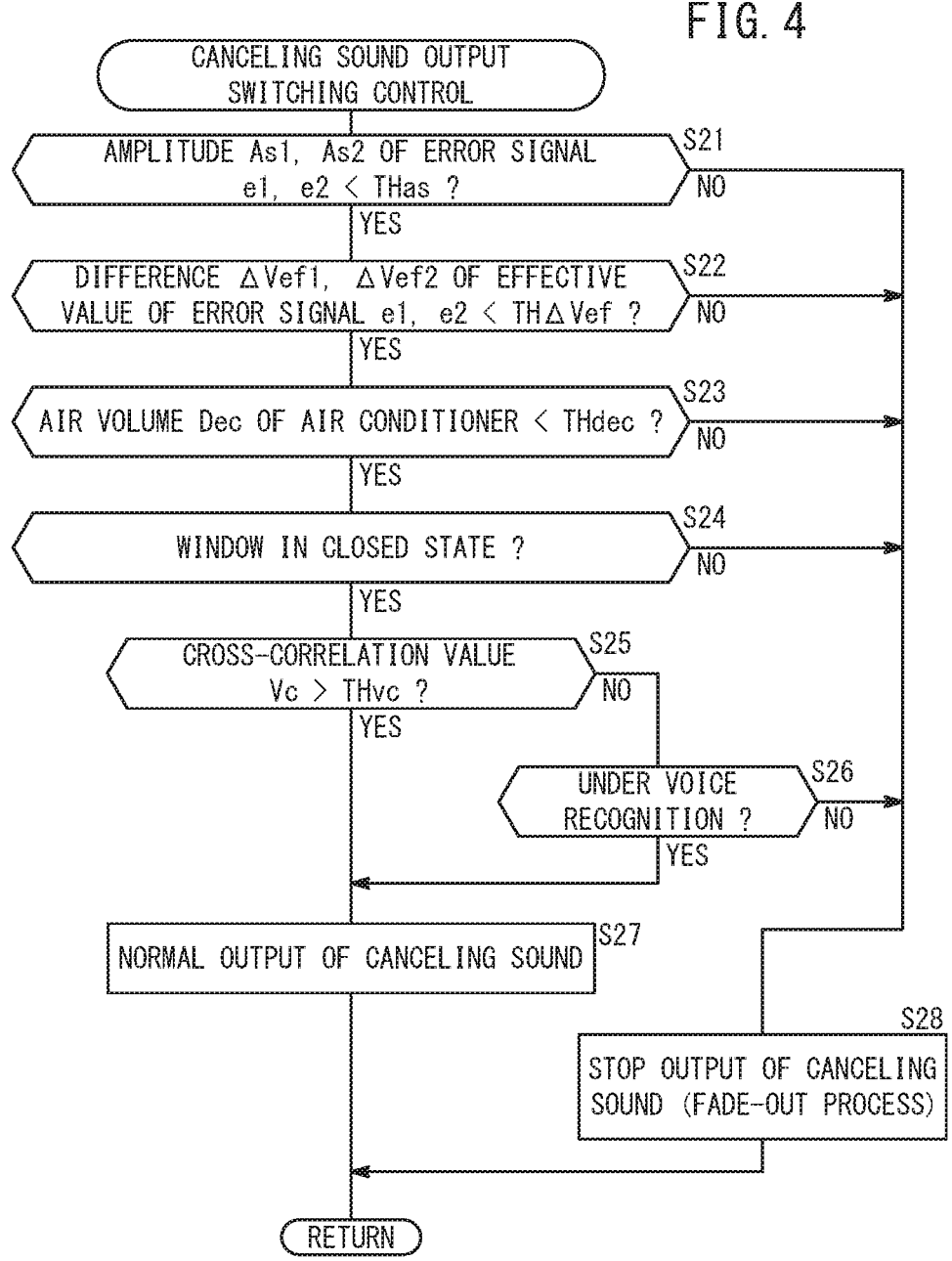
FIG. 4 is a flowchart of canceling sound output switching control according to the first embodiment.

FIG. 4 is a flowchart of the canceling sound output switching control according to the first embodiment. The canceling sound output switching control is control for switching the output of the canceling sound CS, and is executed by the output switching unit 78. The process of FIG. 4 is executed at every predetermined calculation cycle.

In step S21 of FIG. 4, the output switching unit 78 determines whether or not the amplitudes AS1, AS2 [V] of the error signals e1, e2 are lower than the amplitude threshold value THas. The amplitude threshold value THas is a threshold value for determining whether or not the amplitudes As1 and As2 of the error signals e1, e2 are small enough to output the canceling sound CS. In other words, when the amplitudes As1 and As2 exceed the amplitude threshold value THas, the amplitudes As1 and As2 are too large to sufficiently exhibit the silencing effect by the canceling sound CS. When the amplitudes As1 and As2 are lower than the amplitude threshold value THas (S21: YES), the process proceeds to step S22.

In step S22, the output switching unit 78 determines whether or not the differences ΔVef1, ΔVef2 [V] of the effective values Vef1 and Vef2 of the error signals e1, e2 are lower than the difference threshold value THΔVef. Here, the differences ΔVef1 and ΔVef2 are the difference between the previous value and the current value. For example, ΔVef1=Vef1 (present time)−Vef1 (previous time).

The difference threshold value THΔVef is a threshold value for determining whether or not the differences ΔVef1 and ΔVef2 are small enough to output the canceling sound CS. In other words, when the difference ΔVef1 or ΔVef2 exceeds the difference threshold value THΔVef, the change in either one of the error signals e1, e2 is too large to sufficiently exhibit the silencing effect by the canceling sound CS. When the differences ΔVef1 and ΔVef2 are each lower than the difference threshold value THΔVef (S22: YES), the process proceeds to step S23.

In step S23, the output switching unit 78 determines whether or not the air volume Dec of the air conditioner 26 falls below the air volume threshold value THdec. The air volume threshold value THdec is a threshold value for determining whether the air volume Dec is small enough to output the canceling sound CS. In other words, when the air flow Dec exceeds the air volume threshold value THdec, the output sound of the air conditioner 26 is too large sufficiently exhibit the silencing effect by the canceling sound CS. When the air flow Dec is lower than the air volume threshold value THdec (523: YES), the process proceeds to step S24.

In step S24, the output switching unit 78 determines whether the window 92 is in the closed state (in other words, whether the window 92 is not in the open state). This determination is made based on the window information Iw from the window ECU 28. When the window 92 is in the closed state (S24: YES), the process proceeds to step S25.

In step S25, the output switching unit 78 determines whether or not the cross-correlation value Vc exceeds the cross-correlation threshold value THvc (hereinafter also referred to as "correlation threshold value THvc"). The correlation threshold value THvc is a threshold value for determining whether or not the cross-correlation value Vc is larger enough to output the canceling sound CS. In other words, when the cross-correlation value Vc is lower than the correlation threshold value THvc, there is a high possibility that a disturbance has entered the error signal e1 or e2, so that the silencing effect by the canceling sound CS will not be sufficiently exhibited. When the cross-correlation value Vc exceeds the correlation threshold value THvc (S25: YES), the process proceeds to step S27. When the cross-correlation value Vc does not exceed the correlation threshold value THvc (S25: NO), the process proceeds to step S26.

In step S26, the output switching unit 78 determines whether or not the voice recognition device 30 is performing voice recognition. This determination is made based on the voice recognition information Ivr from the voice recognition device 30. In the case where voice recognition is in progress (S26: YES), the disturbance caused in the error signal e1 or e2 may be due to the occupant's utterance. In this case, the process proceeds to step S27.

If step S25: YES or S26: YES, in step S27, the output switching unit 78 performs normal output of canceling sound CS. When any one of the steps S21 to S24 and S26 is NO, the output switching unit 78 stops the output of the canceling sound CS in the step S28. At that time, the output switching unit 78 causes the fade-out processing unit 86 to execute the fade-out processing to fade out the canceling sound CS.

The fade-out process here is, for example, a process of gradually decreasing the filter coefficient W1 by repeatedly multiplying the present filter coefficient W1 by a value larger than 0 and smaller than 1 (for example, 0.95).

<A-3. Effect of the First Embodiment

According to the first embodiment as described above, when it is determined that the cross-correlation value Vc of the first error signal e1 and the second error signal e2 is lower than the cross-correlation threshold value THvc (S25: NO in FIG. 4), the increase of the canceling sound CS (canceling output) is restricted (S28). Thus, when the influence of the disturbance entering the first error signal e1 or the second error signal e2 is large, it becomes possible to prevent the divergence of the control or the occurrence of the unintended canceling sound CS by restricting the increase of the canceling sound CS.

In the first embodiment, when the frequencies fsm1, fsm2 of the error signals e1, e2 are higher than the allowable lowest frequency f min (S7: YES in FIG. 3), the cross-correlation value calculating unit 76 (FIG. 2) calculates the correlation value Vc of the error signals e1, e2 (S8). If the frequency fsm1 or fsm2 of the error signals e1, e2 does not exceed the allowable lowest frequency f min (S7: NO), the calculating unit 76 does not calculate the cross-correlation value Vc (S9).

When the frequencies fsm1 or fsm2 of the error signals e1, e2 is relatively low, the variation of the cross-correlation value Vc tends to be large. Therefore, when the frequencies fsm1, fsm2 of the error signals e1, e2 are relatively low, it is not possible to limit the increase in the canceling sound CS (S28 in FIG. 4) at an appropriate scene by not calculating the cross-correlation value Vc.

In the first embodiment, the cross-correlation value calculation unit 76 acquires the vehicle speed V of the vehicle 10 where the ANC apparatus 24 (active vibration noise control apparatus) is disposed, and switches the allowable lowest frequency f min according to the vehicle speed V (S6 in FIG. 3). Thus, by switching the utilization of the cross-correlation value Vc according to the vehicle speed V, it is possible to suppress the increase of the filter coefficient W1 (S28 of FIG. 4) at an appropriate scene.

In the first embodiment, the ANC ECU 50 (adaptive control circuit) determines whether or not the amplitudes As1, As2 of the error signals e1, e2 exceed the amplitude threshold value THas (S21 in FIG. 4). When the amplitude AS1 or AS2 of the error signals e1, e2 exceeds the amplitude threshold value THas (S21: NO), the ANC ECU 50 limits the increase of W1 regardless of whether or not the cross-correlation value Vc exceeds the cross-correlation threshold value THvc (S25) (S28).

As a result, when the amplitudes As1 or As2 of the error signals e1, e2 becomes excessively large, the increase in the filter coefficient W1 is limited (S28) to prevent the divergence of control or the occurrence of an unintended canceling sound CS.

In the first embodiment, the ANC ECU 50 (adaptive control circuit) calculates the differences ΔVef1, ΔVef2 of the effective values Vef1, Vef2 with respect to the previous value and the current value of the error signals e1, e2, and determines whether or not the difference ΔVef1 and ΔVef2 exceeds the difference threshold value THΔVef (S22 in FIG. 4). When the difference ΔVef1 or ΔVef2 exceeds the difference threshold value THΔVef (S22: NO), the ANC ECU 50 limits the increase in the filter coefficient W1 (S28) regardless of whether the cross-correlation value Vc exceeds the cross-correlation threshold value THvc (S25). As a result, when the differences ΔVef1 or ΔVef2 of the effective values Vef1, Vef2 of the error signals e1, e2 become excessively large, divergence of control or unintentional canceling sound CS can be prevent from occurring by limiting the increase of the filter coefficient W1.

In the first embodiment, the ANC ECU 50 (adaptive control circuit) acquires the air volume Dec of the air conditioner 26 of the vehicle 10 where the ANC apparatus 24 (active vibration noise control apparatus) is disposed, and determines whether or not the air volume Dec exceeds the air volume threshold value THdec (S23 in FIG. 4). If the air volume Dec exceeds the air volume threshold value THdec (S23: NO), the ANC ECU 50 limits the increase of the filter coefficient W1 (S28) regardless of whether or not the cross-correlation value Vc exceeds the cross-correlation threshold value THvc (S25).

As a result, when the air volume Dec of the air conditioner 26 becomes excessively large, it is possible to prevent divergence of control or occurrence of unintended canceling sound CS by limiting the increase of the filter coefficient W1 (S28).

In the first embodiment, the ANC ECU 50 (adaptive control circuit) specifies whether or not the window 92 of the vehicle 10 where the ANC apparatus 24 (active vibration noise control apparatus) is placed is in the open state S24 in FIG. 4). If the window 92 is in the open state (S24: NO), the ANC ECU 50 limits the increase in the filter coefficient W1 (S28) regardless of whether or not the cross-correlation value Vc exceeds the cross-correlation threshold value THvc (S25).

As a result, when the window 92 of the vehicle 10 is in the open state, it is possible to prevent divergence of control or occurrence of unintended canceling sound CS by limiting the increase of the filter coefficient W1 (S28).

In the first embodiment, the cross-correlation value calculation unit 76 sets the window length Lw of the window function WF that specifies the extraction portion for calculating the cross-correlation value Vc out of the error signals e1, e2 (S3 in FIG. 3). Then, the calculating unit 76 calculates the cross-correlation value Vc for the extracted portion specified by using the window length Lw (S8). Further, the calculation unit 76 acquires the rotational speed Ne of the engine 40 (running drive source) of the vehicle 10 (S1), and changes the window length Lw of the window function WF according to the rotational speed Ne (S2, S3).

Thus, the range of the extraction portion of the error signals e1, e2 used for calculating the cross-correlation value Vc is changed in accordance with the rotational speed Ne of the engine 40. When the rotational speed Ne is high, the main components of the error signals e1, e2 are high-frequency components. In this case, for example, by shortening the window length Lw of the window function WF, it is possible to shorten the calculation cycle of the cross-correlation value Vc or to improve the detection accuracy of the cross-correlation value Vc (because the influence of the low frequency component decreases).

In the first embodiment, the cross-correlation value calculation unit 76 estimates the frequency fse of the error signals e1, e2 (S2 in FIG. 3) based on the rotational speed Ne of the engine 40 (running drive source) (S2 in FIG. 3), and sets the reciprocal 1/fse of the estimated frequency fse to the window length Lw of the window function WF (S3). This makes it possible to set the window length Lw of the window function WF by a relatively simple method.

In the first embodiment, the ANC ECU 50 (adaptive control circuit) specifies whether or not the voice recognition device 30 is performing voice recognition (S26 in FIG. 4). When the voice recognition device 30 is performing voice recognition (S26: YES), regardless of whether the cross-correlation value Vc falls below the cross-correlation threshold value THvc (S25), the increase of the filter coefficient W1 is permitted (S27).

As a result, even when a disturbance occurs in the error signal e1 or e2 with voice input to the first microphone 54a or the second microphone 54b, the generation of the canceling sound CS (canceling output) is continued. Therefore, by limiting the increase of the canceling sound CS at the time of voice recognition (S28), it is possible to prevent the voice recognition from becoming rather difficult.

B. Second Embodiment

<B-1. Configuration of Second Embodiment (Difference from First Embodiment)>
[B-1-1. Overall Configuration]

Figure 5:
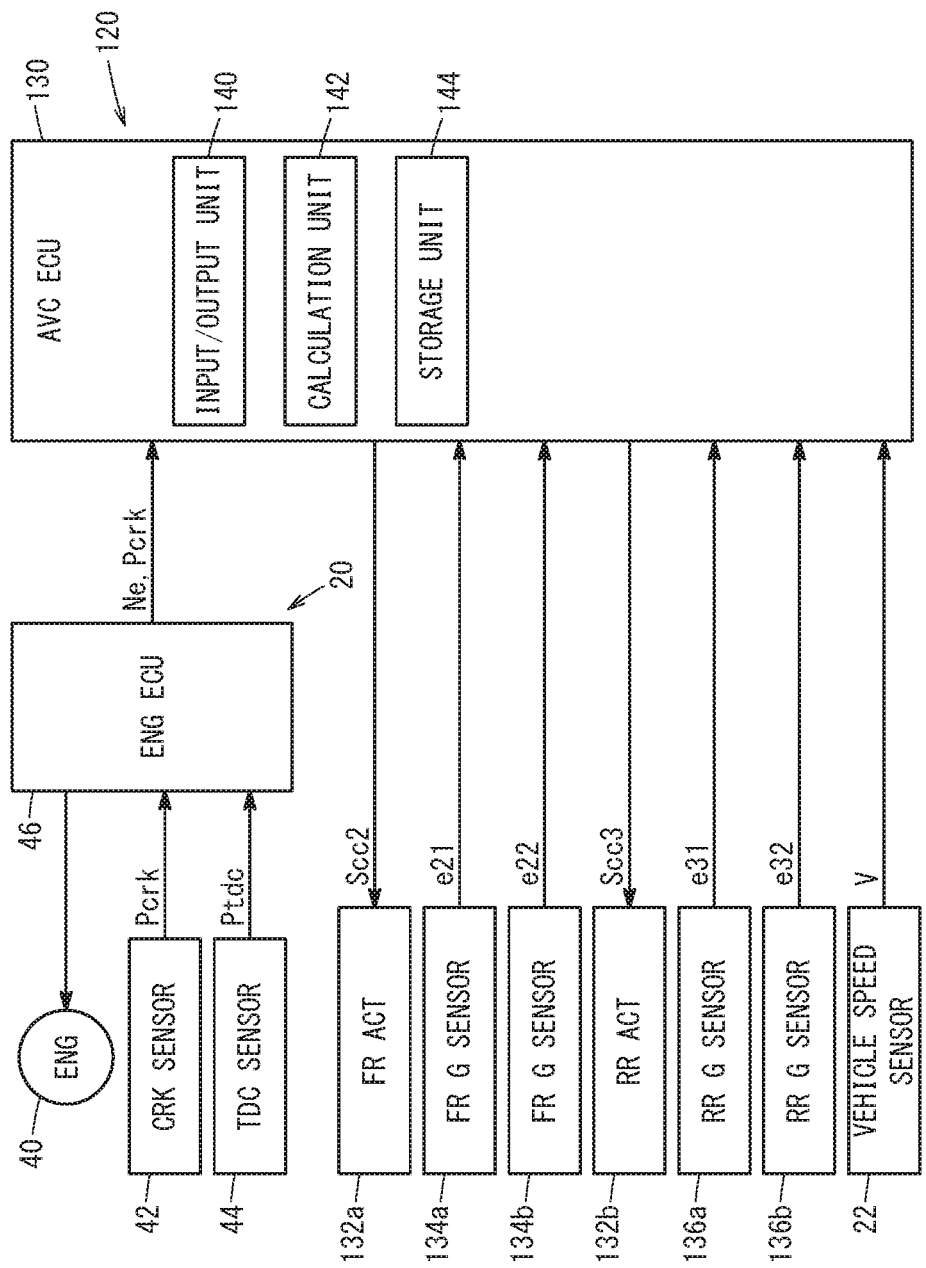
FIG. 5 is a diagram showing a schematic configuration of a vehicle equipped with an active noise control apparatus as an active vibration noise control apparatus according to a second embodiment of the present invention.

FIG. 5 shows a schematic configuration of a vehicle 10A on which an active vibration control apparatus 120 (hereinafter referred to as "AVC apparatus 120") as an active vibration noise control apparatus according to a second embodiment of the present invention is mounted. The vehicle 10A includes an engine unit 20 and a vehicle speed sensor 22 in addition to the AVC apparatus 120. Constituent elements similar to those of the first embodiment are denoted by the same reference numerals, and a detailed description thereof will be omitted.

In the first embodiment, the vibration noise VN (target noise) is reduced by outputting a canceling sound CS (canceling output) from the speaker 52 (FIG. 1). In contrast, in the second embodiment, by outputting canceling vibration CV (canceling output) from the AVC apparatus 120, the engine vibration EV (target vibration) transmitted from the engine 40 to the subframe (not shown) is reduced.

[B-1-2. AVC Apparatus 120]
(B-1-2-1. Overview)

The AVC apparatus 120 cancels the engine vibration EV at a specific evaluation point by outputting canceling vibration CV to the vibration EV generated by the engine 40. The evaluation point here can be, for example, the position (first to fourth evaluation points) of the acceleration sensors 134a, 134b, 136a, 136b which will be described later. The AVC apparatus 120 is a so-called active control mount (ACM). As shown in FIG. 5, the AVC apparatus 120 includes an active vibration control electronic control unit 130 (hereinafter referred to as "AVC ECU 130"), actuators 132a, 132b, front side acceleration sensors 134a, 134b, and rear side acceleration sensors 136a, 136b.

(B-1-2-2. AVC ECU 130)
(B-1-2-2-1. Overview of the AVC ECU 130)

The AVC ECU 130 (adaptive control circuit, active vibration noise control circuit) generates combined control signals Scc2, Scc3 by performing so-called adaptive control on the crank pulse Pcrk (engine signal). The combined control signals Scc2, Scc3 indicate canceling vibrations CV corresponding to the rotation of the engine 40. As shown in FIG. 5, the AVC ECU 130 includes an input/output unit 140, a calculation unit 142, and a storage unit 144 as hardware. Except for configurations peculiar to the present invention (the cross-correlation value calculation units 154a, 154b, the output switching unit 156, etc.), the same configuration as in the conventional AVC ECU (for example, US 2012/0032619 A1) is usable as the basic configuration of the AVC ECU 130.

(B-1-2-2-2. Input/output Unit 140)

The input/output unit 140 inputs and outputs signals between the AVC ECU 130 and external devices (the vehicle speed sensor 22, the ENG ECU 46, etc.).

(B-1-2-2-3. Calculation Unit 142)
(B-1-2-2-3-1. Outline of calculation Unit 142)

The calculation unit 142 includes a central processing unit (CPU) (not shown) and controls the entire AVC apparatus 120 by executing a program stored in the storage unit 144. A part of the program may be replaced with an electric circuit or an electronic circuit as hardware.

Figure 6:
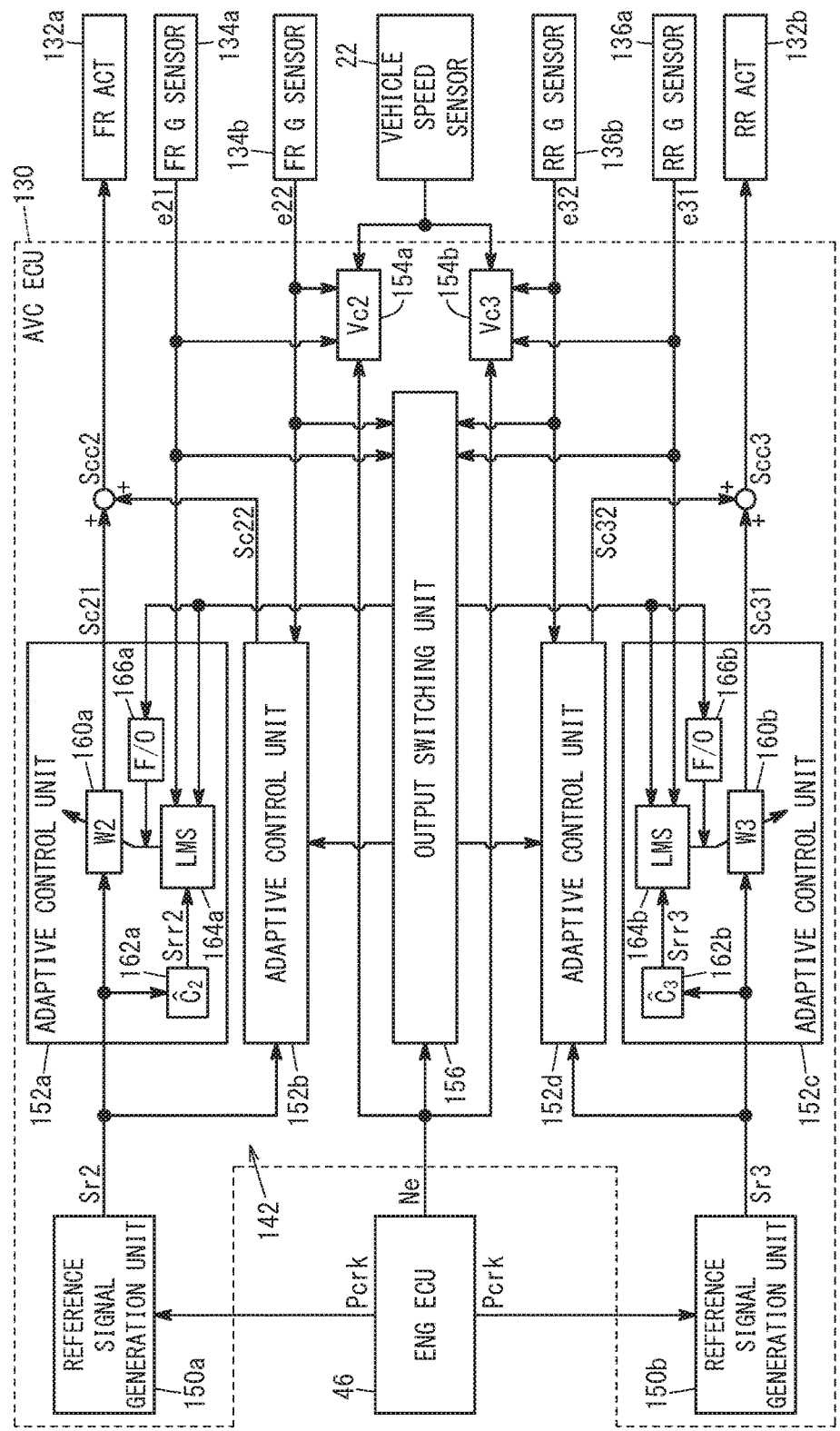
FIG. 6 is a block diagram showing a calculation unit and its periphery of an electronic control unit of the active vibration control in the second embodiment.

FIG. 6 is a block diagram showing the calculation unit 142 and the periphery of the AVC ECU 130 according to the second embodiment. As shown in FIG. 6, the calculation unit 142 includes reference signal generation units 150a, 150b, adaptive control units 152a, 152b, 152c, 152d, cross-correlation value calculation units 154a, 154b, and an output switching unit 156.

(B-1-2-2-3-2. Reference Signal Generators 150a, 150b)

The reference signal generation units 150a, 150b generate the reference signals Sr2, Sr1 based on the CRK pulse Pcrk as the basic signal, and output them to the adaptive control units 152a to 152d.

(B-1-2-2-3-3. Adaptive Control Units 152a to 152d)

As shown in FIG. 6, the adaptive control unit 152a includes an adaptive filter 160a, a reference signal correcting unit 162a, a filter coefficient calculation unit 164a, and a fade-out processing unit 166a. Although not shown in FIG. 6, the adaptive control unit 152b also has the same configuration as the adaptive control unit 152a.

The adaptive control unit 152c includes an adaptive filter 160b, a reference signal correcting unit 162b, a filter coefficient calculation unit 164b, and a fade-out processing unit 166b. Although not shown in FIG. 6, the adaptive control unit 152d also has the same configuration as the adaptive control unit 152c.

The adaptive filters 160a, 160b are, for example, FIR (Finite Impulse Response) type or adaptive notch type filters. The adaptive filters 160a, 160b perform adaptive filter processing using the filter coefficients W2, W3 on the reference signals Sr2, Sr3 to output the control signals Sc21, Sc22, Sc31 and Sc32.

The reference signal correction units 162a, 162b generate the correction reference signals Srr2, Srr3 by performing transfer function processing on the reference signals Sr2, Sr3. The correction reference signals Srr2, Srr3 are used in filter coefficient calculation units 164a, 164b to calculate filter coefficients W2, W3. The transfer function process is a process for correcting the reference signals Sr2, Sr3 based on the transfer functions $C_2\hat{}$, $C_3\hat{}$ (filter coefficients) of the canceling vibration CV from the actuators 132a, 132b to the acceleration sensors 134a, 134b, 136a, 136b. The transfer functions $C_2\hat{}$ and $C_3\hat{}$ used in this transfer function processing are measured values or predicted values of the actual transfer functions $C_2$, $C_3$ of the canceling vibration CV from the actuators 132a, 132b to the acceleration sensors 134a, 134b, 136a, 136b.

The filter coefficient calculation units 164a, 164b (hereinafter also referred to as "calculation units 164a, 164b") sequentially calculates and updates the filter coefficients W2 and W3. The calculation units 164a, 164b calculate the filter coefficients W2 and W3 using adaptive algorithm operation {e.g., least squares method (LMS) algorithm operation}. That is, on the basis of the correction reference signals Srr2, Srr3 from the reference signal correction units 162a, 162b and the error signals e21, e22, e31, e32 from the acceleration sensors 134a, 134b, 136a, 136b, the calculation units 164a, 164b calculate filter coefficients W2, W3 so that the square of the error signals e21, e22, e31, e32 is zero. The specific calculation in the filter coefficient calculation units 164a, 164b can be performed in the same manner as in US 2012/0032619 A1, for example.

The fade-out processing units 166a, 166b perform fade-out processing based on a command from the output switching unit 156. The fade-out process is a process of gradually decreasing the filter coefficients W2, W3 of the adaptive filters 160a, 160b to stop the output of the canceling vibration CV.

(B-1-2-2-3-4. Cross-Correlation Value Calculation Units 154a, 154b)

The cross-correlation value calculation unit 154a (hereinafter also referred to as "calculation unit 154a") calculates the cross-correlation value Vc2 of the error signals e21, e22 and outputs it to the output switching unit 156. Similarly, the cross-correlation value calculation unit 154b (hereinafter also referred to as "calculation unit 154b") calculates the cross-correlation value Vc3 of the error signals e31, e32 and outputs it to the output switching unit 156. The method of calculating the cross-correlation values Vc2, Vc3 is the same as that in the first embodiment for the cross-correlation value Vc.

(B-1-2-2-3-5. Output Switching Unit 156)

The output switching unit 156 (canceling output limiting unit) switches the output of the canceling vibration CV based on various kinds of information. The information here includes information on the cross-correlation values Vc2, Vc3, the reference signals Sr2, Sr1 and information on the error signals e21, e22, e31, e32 (difference ΔVef in the amplitude As and the effective value Vef). Details of the operation of the output switching unit 156 will be described later with reference to FIG. 7.

(B-1-2-2-4. Storage Unit 144)

The storage unit 144 has a nonvolatile memory and a volatile memory, and stores programs and data used by the calculation unit 142.

[B-1-3. Actuators 132a, 132b]

The actuators 132a and 132b (canceling output generating unit) are disposed between the engine 40 and a subframe (not shown) that supports the engine 40. An actuator 132a (hereinafter also referred to as "front side actuator 132a") is arranged to support the front side of the engine 40. An actuator 132b (hereinafter also referred to as "rear side actuator 132b") is arranged to support the rear side of the engine 40.

Each of the actuators 132a, 132b suppresses the transmission of the vibration EV from the engine 40 to the subframe by repeating the advancing and retracting operation based on the command (the combined control signals Scc2 and Scc3) from the AVC ECU 130. As a specific configuration of the actuators 132a, 132b, for example, those described in US 2012/0032619 A1 can be used. In FIGS. 5 and 6, the front side actuator 132a is denoted as "FR ACT", and the rear side actuator 132b is denoted as "RR ACT".

[B-1-4. Acceleration Sensors 134a, 134b, 136a, 136b]

Acceleration sensors 134a, 134b (hereinafter also referred to as "front side acceleration sensors 134a, 134b") are disposed in the vicinity of the front side actuator 132a in the subframe. The acceleration sensors 134a, 134b (error detection unit) detect the engine vibration EV transmitted to the vicinity of the front side actuator 132a as the acceleration Gf. The acceleration Gf here means the acceleration in the expansion/contraction direction of the actuator 132a. The error signals e21, e22 indicating the acceleration Gf are transmitted to the filter coefficient calculation unit 164a, the cross-correlation value calculation unit 154a, and the output switching unit 156.

When arranging the acceleration sensors 134a, 134b close to each other, it is possible to use a common value for the transfer function $C_2\hat{}$ from the actuator 132a to the acceleration sensors 134a, 134b. When arranging the acceleration sensors 134a, 134b apart from each other, it is possible to separately set the transfer function $C_2\hat{}$ from the actuator 132a to the acceleration sensor 134a and the transfer function $C_2\hat{}$ from the actuator 132a to the acceleration sensor 134b.

Acceleration sensors 136a, 136b (hereinafter also referred to as "rear side acceleration sensors 136a, 136b") is arranged in the vicinity of the rear side actuator 132b in the subframe. The acceleration sensors 136a, 136b (error detection unit) detect the engine vibration EV transmitted to the vicinity of the rear side actuator 132b as the acceleration Gr. The acceleration Gr here means the acceleration in the expansion/contraction direction of the actuator 132b. The error signals e31 and e32 indicating the acceleration Gr are transmitted to the filter coefficient calculation unit 164b, the cross-correlation value calculation unit 154b, and the output switching unit 156.

As a specific configuration of the acceleration sensors 134a, 134b, 136a, 136b, known ones (for example, those described in US 2012/0032619 A1) can be used. In FIGS. 5 and 6, the front side acceleration sensors 134a, 134b are denoted as "FR G sensor", and the rear side acceleration sensors 136a, 136b are denoted as "RR G sensor".

<B-2. Various Controls in the Second Embodiment>

[B-2-1. Cross-Correlation Value Calculation Control]

In the second embodiment, a cross-correlation value calculation control is executed in the same manner as in the first embodiment (FIG. 3). The cross-correlation value calculation control in the second embodiment is a control to calculate the cross-correlation value Vc2 of the error signals e21, e22, and the cross-correlation value Vc3 of the error signals e31 and e32.

The cross-correlation value calculation unit 154a executes the cross-correlation value calculation control when calculating the cross-correlation value Vc2. The cross-correlation value calculation unit 154b executes the cross-correlation value calculation control when calculating the cross-correlation value Vc3. The processing as shown in FIG. 3 is executed at every predetermined calculation cycle.

[B-2-2. Canceling Vibration Output Switching Control]

Figure 7:
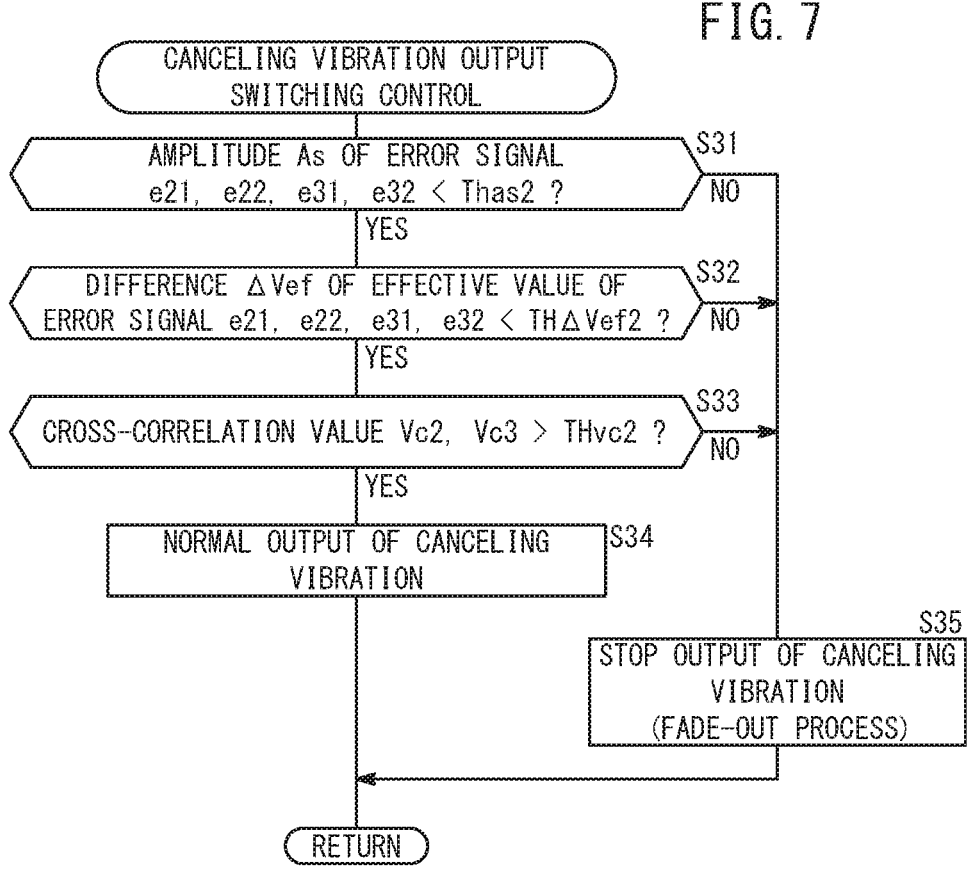
FIG. 7 is a flowchart of canceling vibration output switching control according to the second embodiment.

FIG. 7 is a flowchart of canceling vibration output switching control in the second embodiment. The canceling vibration output switching control is a control for switching the output of the canceling vibration CV and is executed by the output switching unit 156. The process of FIG. 7 is executed at every predetermined calculation cycle.

In step S31 of FIG. 7, the output switching unit 156 determines whether or not the amplitude As of each of the error signals e21, e22, e31, e32 (target signal) is lower than the amplitude threshold value THas2.

The amplitude threshold value THas2 is a threshold value for determining whether or not the amplitude As of each of the error signals e21, e22, e31, e32 is so large that it is not suitable for outputting the canceling vibration CV. In other words, when the amplitude As exceeds the amplitude threshold value THas2, the amplitude As is too large to sufficiently exhibit the vibration suppression effect by the canceling vibration CV. When the amplitude As is smaller than the amplitude threshold value THas2 (S31: YES), the process proceeds to step S32.

In step S32, the output switching unit 78 determines whether or not the difference ΔVef of each of the effective values Vef of the error signals e21, e22, e31, e32 falls below the difference threshold THΔVef2. The difference ΔVef here is the difference between the previous value and the current value.

The difference threshold value THΔVef2 is a threshold value for determining whether or not the difference ΔVef is so small that it is suitable for outputting the canceling vibration CV. In other words, when the difference ΔVef exceeds the difference threshold value THΔVef2, the change in any one of the error signals e21, e22, e31, e32 is too large to sufficiently exhibit the vibration suppression effect by the canceling vibration CV. When the difference ΔVef is smaller than the difference threshold value THΔVef2 (S32: YES), the process proceeds to step S33.

In step S33, the output switching unit 156 determines whether or not the cross-correlation values Vc2, Vc3 exceeds the cross-correlation threshold values THvc2 (hereinafter also referred to as "correlation threshold values THvc2"). The correlation threshold value THvc2 is a threshold value for determining whether or not the cross-correlation values Vc2, Vc3 are so large that they are suitable for outputting the canceling vibration CV. In other words, when the cross-correlation value Vc2 or Vc3 is lower than the correlation threshold value THvc2, there is a high possibility that the disturbance has entered into one of the error signals e21, e22, e31, e32, so that the vibration suppression effect by the canceling vibration CV is not sufficiently exhibited. When the cross-correlation values Vc2, Vc3 exceed the correlation threshold value THvc2 (S33: YES), the process proceeds to step S34.

In step S34, the output switching unit 156 performs normal output of the cancel vibration CV. If any of the steps S31 to S33 is NO, in step S35, the output switching unit 156 stops the output of the canceling vibration CV. At that time, the output switching unit 156 causes the fade-out processing units 166a, 166b to execute a fade-out process to fade out the cancel vibration CV.

<B-3. Effects of the Second Embodiment

According to the second embodiment as described above, in addition to or in place of the effects of the first embodiment, the following effects can be exerted.

That is, in the second embodiment, in the case where the cross-correlation values Vc2, Vc3 of the error signals e21, e22, e31, e32 are determined to be lower than the cross-correlation threshold value THvc2 (S33: NO in FIG. 7), the increase in the canceling vibration CV (canceling output) is limited (S35). Thus, when the influence of the disturbance entering the error signals e21, e22, e31, e32 is large, it becomes possible to prevent divergence of control or occurrence of unintended canceling vibration CV by limiting an increase in canceling vibration CV.

C. Third Embodiment

<C-1. Configuration of the Third Embodiment (Difference from First Embodiment)

The configuration of the hardware of the third embodiment is the same as that in the first embodiment (FIGS. 1 and 2). Therefore, the same reference numerals are allotted to the same constituent elements as those in the first embodiment, and a detailed description thereof will be omitted. In the third embodiment, the canceling sound output switching control is different from that in the first embodiment (FIG. 4).

<C-2. Canceling Sound Output Switching Control According to Third Embodiment>

[C-2-1. Flow of Canceling Sound Output Switching Control of Third Embodiment]

Figure 8:
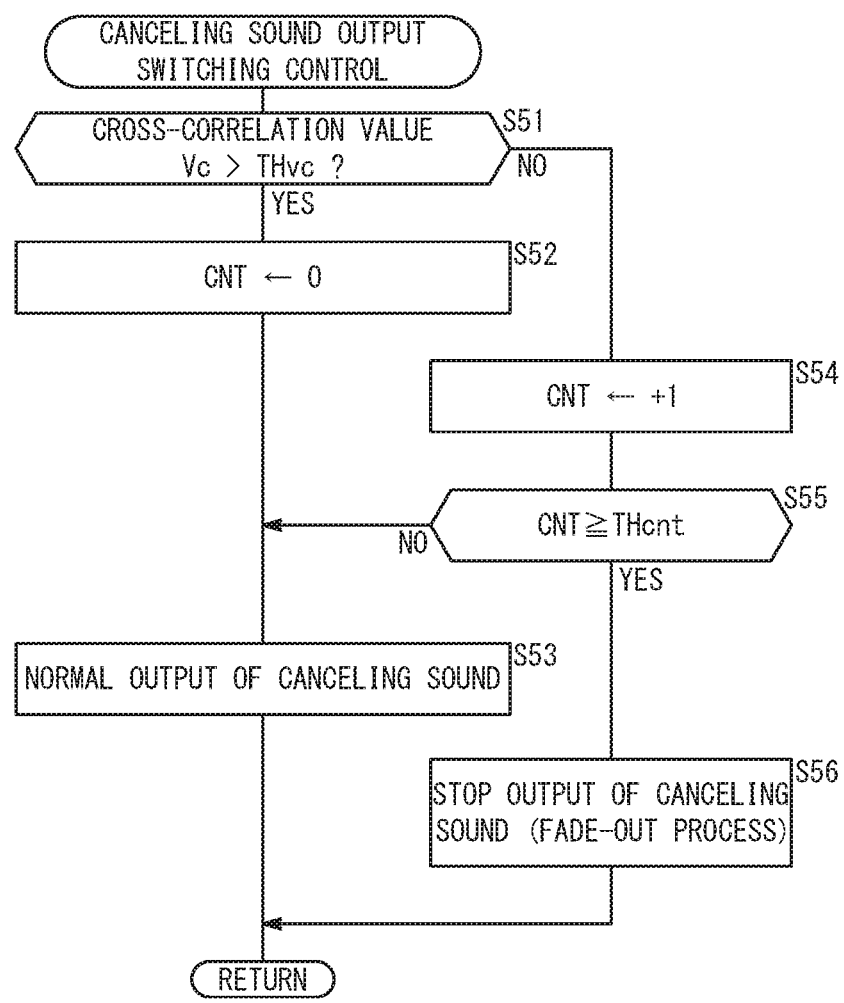
FIG. 8 is a flow chart of canceling sound output switching control according to the third embodiment.

FIG. 8 is a flowchart of canceling sound output switching control according to the third embodiment. The canceling sound output switching control is a control for switching the output of the canceling sound CS, and is executed by the output switching unit 78. The process of FIG. 8 is executed at every predetermined calculation cycle.

In step S51 of FIG. 8, the output switching unit 78 determines whether or not the cross-correlation value Vc exceeds the cross-correlation threshold value THvc. Step S51 is the same as step S25 in FIG. 4. When the cross-correlation value Vc exceeds the correlation threshold value THvc (S51: YES), in step S52, the output switching unit 78 resets the count value CNT. The count value CNT increases from the initial value of zero, as the state in which the cross-correlation value Vc is less than or equal to the correlation threshold value THvc continues. In other words, the count value CNT indicates the number of times (or the number of calculation cycles Ts of the cross-correlation value Vc) that the cross-correlation value Vc is equal to or less than the correlation threshold value THvc. In the following step S53, the output switching unit 78 performs normal output of the canceling sound CS.

Returning to step S51, if the cross-correlation value Vc does not exceed the correlation threshold value THvc (S51: NO), in other words, if the cross-correlation value Vc is less than or equal to the correlation threshold value THvc, the process proceeds to step S54. In step S54, the output switching unit 78 increases the count value CNT by one.

In step S55, the output switching unit 78 determines whether or not the count value CNT is greater than or equal to the count threshold value THcnt. The count threshold value THcnt (number-of-times threshold value) is a threshold value for determining a state whether or not the cross-correlation value Vc is low, and is 3 in the present embodiment. When the count value CNT is not equal to or larger than the count threshold value THcnt (S55: NO), in step S53, the output switching unit 78 performs normal output of the canceling sound CS.

When the count value CNT is equal to or larger than the count threshold value THcnt (S55: YES), in step S56, the output switching unit 78 stops outputting the canceling sound CS. Step S56 is performed in the same manner as step S28 in FIG. 4.

[C-2-2. Application Example of Canceling Sound Output Switching Control of Third embodiment]

Figure 9:
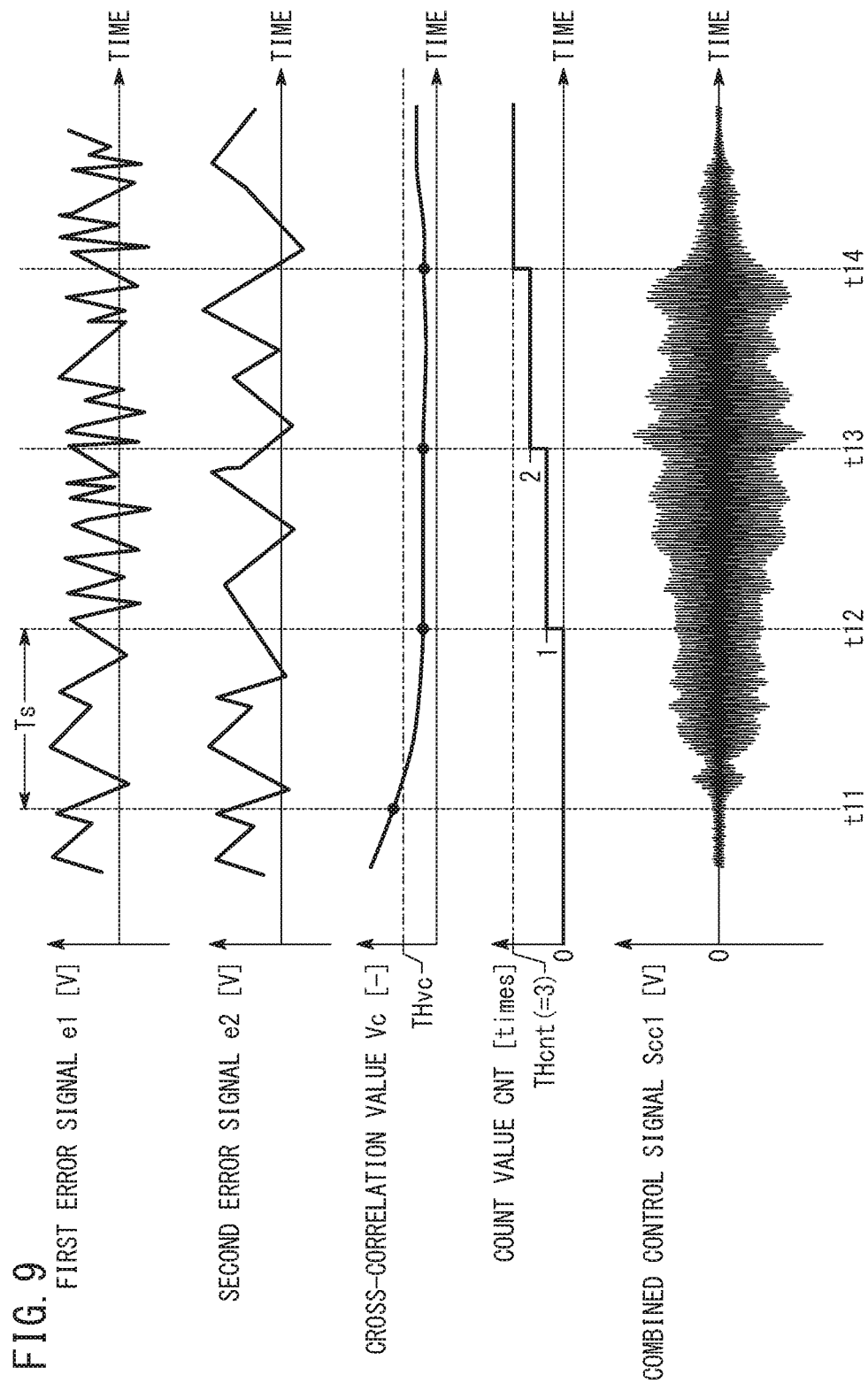
FIG. 9 is a time chart showing an example of a first error signal, a second error signal, a cross-correlation value, a count value, and a combined control signal during an execution of the canceling sound output switching control according to the third embodiment.

FIG. 9 is a timeline chart showing an example of the first error signal e1, the second error signal e2, the cross-correlation value Vc, the count value CNT, and the combined control signal Scc1 during execution of the canceling sound output switching control according to the third embodiment. In FIG. 9, the cross-correlation value Vc is calculated at each predetermined calculation cycle.

In FIG. 9, at the time point t11, the cross-correlation value Vc exceeds the correlation threshold value THvc (S51 in FIG. 8: YES). For this reason, the output switching unit 78 performs normal output of the snooze CS (S53). At the time point t12, the cross-correlation value Vc is equal to or lower than the correlation threshold value THvc (S51: NO in FIG. 8). Therefore, the output switching unit 78 increases the count value CNT by 1 to 1 (S54). In this case, since the count value CNT is not equal to or larger than the count threshold value THcnt (S55: NO), the output switching unit 78 continues normal output of the canceling sound CS (S53).

Even at the time t13, the cross-correlation value Vc is equal to or lower than the correlation threshold value THvc (S51: NO in FIG. 8). Therefore, the output switching unit 78 increases the count value CNT by 1 to 2 (S54). Also in this case, since the count value CNT is not equal to or more than the count threshold value THcnt (S55: NO), the output switching unit 78 continues the normal output of the canceling sound CS (S53).

Even at the time t14, the cross-correlation value Vc is equal to or lower than the correlation threshold value THvc (S51: NO in FIG. 8). Therefore, the output switching unit 78 increases the count value CNT by 1 to 3 (S54). In this case, since the count value CNT is equal to or larger than the count threshold value THcnt (S55: YES), the output switching unit 78 stops the output of the canceling sound CS (S56).

<C-3. Effect of Third Embodiment>

According to the third embodiment as described above, in addition to or in place of the effects of the first embodiment and the second embodiment, the following effects can be obtained.

That is, in the third embodiment, the output switching unit 78 (canceling output limiting unit) determines whether or not the cross-correlation value Vc falls below the cross-correlation threshold value THvc at every calculation cycle Ts (first predetermined cycle) (S51 in FIG. 8), while the number of times the cross-correlation value Vc falls below the correlation threshold value THvc is counted as the count value CNT (S54). When the count value CNT has reached the count threshold value THcnt (S55: YES), the output switching unit 78 limits the increase in the canceling output (S56). As a result, the determination of a situation where the cross-correlation value Vc of the first error signal e1 (the first target signal) and the second error signal e2 (the second target signal) is lower than the correlation threshold value THvc can be more reliable.

D. Fourth Embodiment

<D-1. Configuration of Fourth Embodiment (Difference from First Embodiment)>

Figure 10:
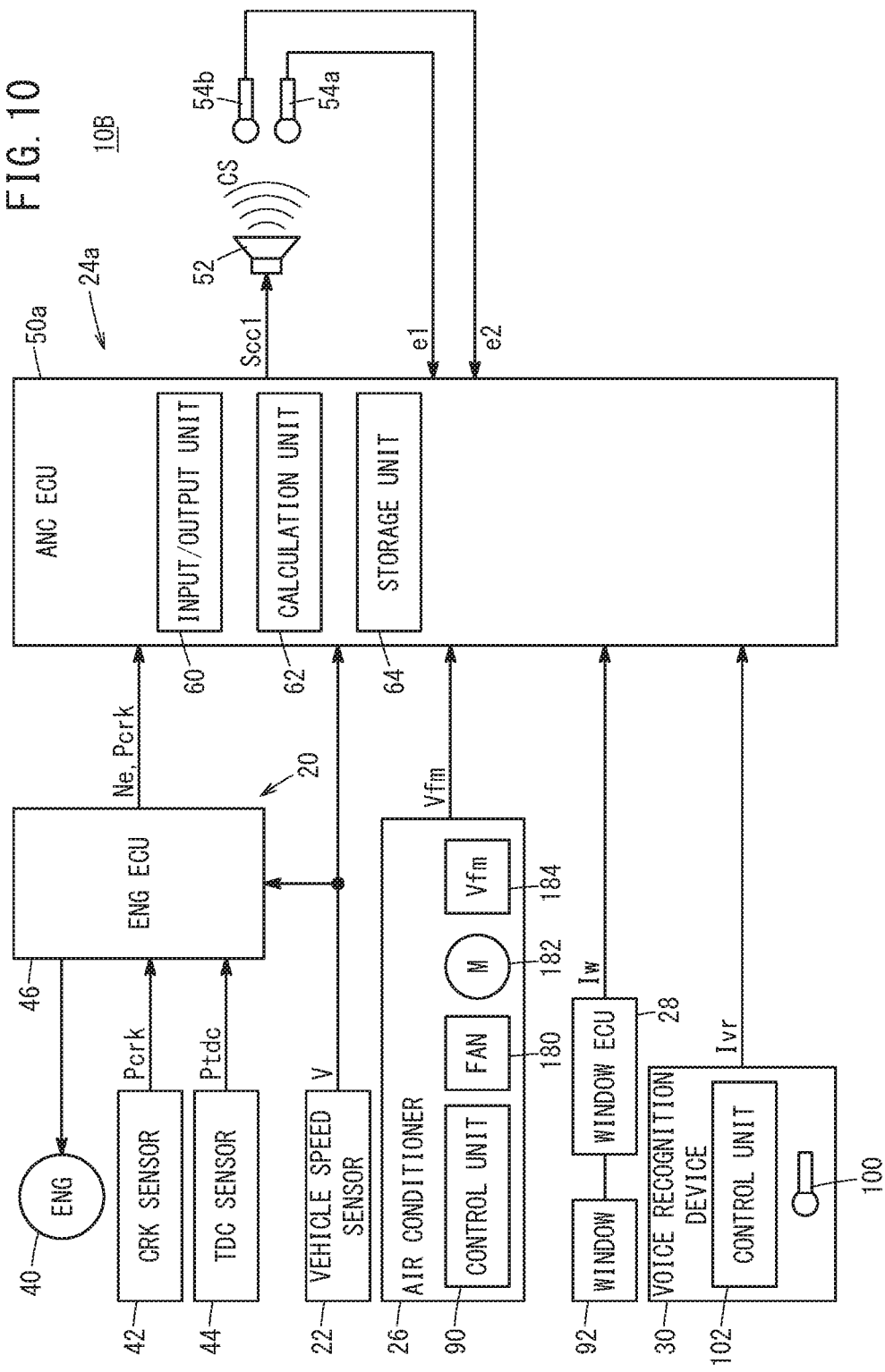
FIG. 10 is a diagram showing a schematic configuration of a vehicle equipped with an active noise control apparatus as an active vibration noise control apparatus according to a fourth embodiment of the present invention.

FIG. 10 shows a schematic view of a vehicle 10B on which an active noise control apparatus 24a (hereinafter referred to as "ANC apparatus 24a") is mounted as an active vibration noise control apparatus according to a fourth embodiment of the present invention. The configuration of the hardware of the fourth embodiment is basically the same as that of the first embodiment. Therefore, the same reference numerals are allotted to the same constituent elements as those in the first embodiment, and a detailed description thereof will be omitted.

In the air conditioner 26 of FIG. 10, in addition to the control unit 90, a fan 180, a fan motor 182 and a voltage sensor 184 are shown as constituent elements thereof (the air conditioner 26 in FIG. 1 may have these constituent elements). The motor 182 drives the fan 180 based on a command from the control unit 90. The voltage sensor 184 detects a voltage Vfm (hereinafter also referred to as "applied voltage Vfm") applied from a battery (not shown) to the motor 182 based on a command from the control unit 90. The detected applied voltage Vfm is input to the active noise control electronic control unit 50a (hereinafter referred to as "ANC ECU 50a").

The applied voltage Vfm varies according to the duty ratio of the drive signal input from the control unit 90 to a switching element (not shown) disposed between the battery and the motor 182. Alternatively, when a DC/DC converter (not shown) is provided between the battery and the motor 182, the applied voltage Vfc varies according to the drive signal from the control unit 90 to this DC/DC converter.

Like the ANC ECU 50 (FIG. 2) of the first embodiment, the ANC ECU 50a has an output switching unit 78. The output switching unit 78 of the first embodiment performs the canceling sound output switching control using the air volume Dec of the air conditioner 26 (S23 in FIG. 4). On the other hand, the output switching unit 78 of the fourth embodiment performs the canceling sound output switching control using the applied voltage Vfm (S61 in FIG. 11).

<D-2. Canceling Sound Output Switching Control According to Fourth Embodiment>

Figure 11:
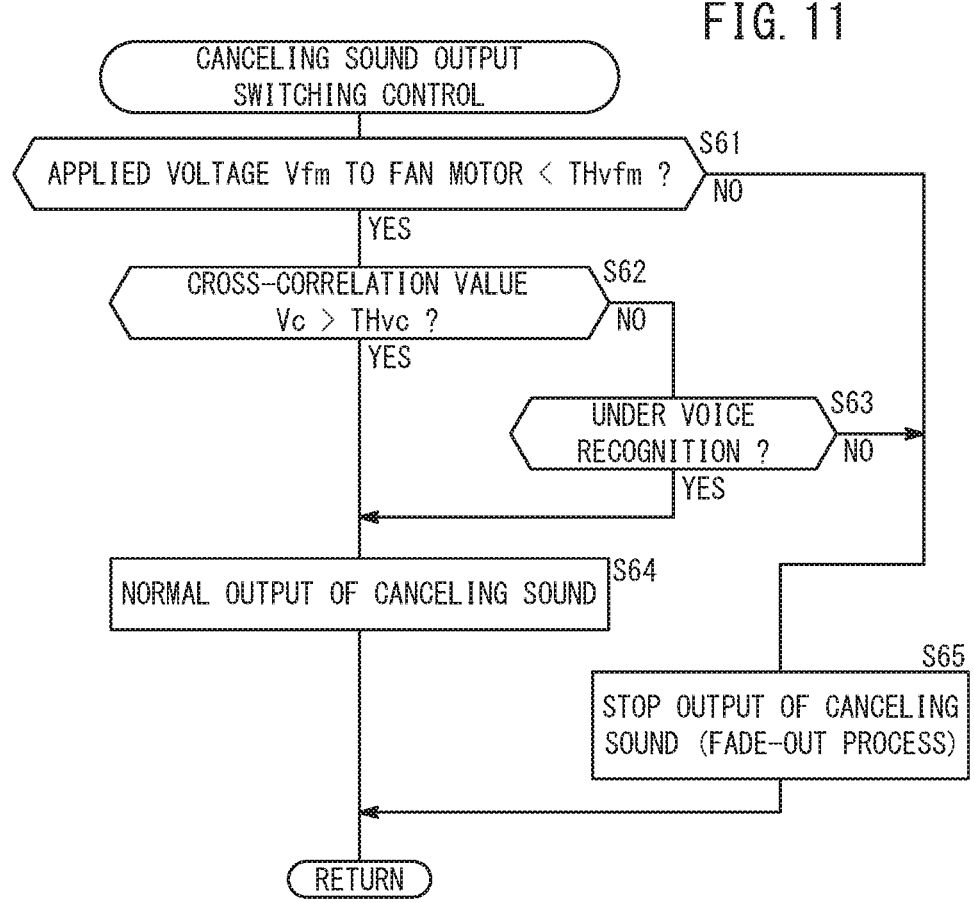
FIG. 11 is a flowchart of a canceling sound output switching control according to the fourth embodiment.

FIG. 11 is a flowchart of the canceling sound output switching control according to the fourth embodiment. The canceling sound output switching control is a control for switching the output of the canceling sound CS, and is executed by the output switching unit 78. The process of FIG. 11 is executed at every predetermined calculation cycle.

In step S61 of FIG. 11, the output switching unit 78 determines whether or not the voltage Vfm applied to the fan motor 182 is lower than the voltage threshold value THvfm. The voltage threshold value THvfm is a threshold value for determining whether or not the air volume Dec of the air conditioner 26 is small enough to output the canceling sound CS. In other words, when the applied voltage Vfm exceeds the voltage threshold value THvfm, the output sound of the air conditioner 26 is too large, so that the silencing effect by the canceling sound CS is not sufficiently exhibited.

When the applied voltage Vfm is lower than the voltage threshold value THvfm (S61: YES), the process proceeds to step S62. When the applied voltage Vfm does not fall below the voltage threshold value THvfm (S61: NO), the process proceeds to step S65. Steps S62 to S65 are the same as steps S25 to S28 of FIG. 4.

<D-3. Effect of Fourth Embodiment>

According to the fourth embodiment as described above, in addition to or in place of the effects of the first to third embodiments, the following effects can be obtained.

That is, in the fourth embodiment, the ANC ECU 50a (adaptive control circuit) acquires the voltage Vfm to be applied to the motor 182 for driving the fan 180 of the air conditioner 26 of the vehicle 10B where the ANC apparatus 24a (active vibration noise control apparatus) is mounted, and determines whether or not the applied voltage Vfm exceeds the voltage threshold value THvfm (S61 in FIG. 11). If the applied voltage Vfm exceeds the voltage threshold value THvfm (S61: NO), the ANC ECU 50 limits the increase of the filter coefficient W1 (FIG. 2) regardless of whether or not the cross-correlation value Vc exceeds the cross-correlation threshold value THvc (S65).

Thus, when the air volume Dec of the air conditioner 26 becomes excessively large, it is possible to prevent the divergence of control or the occurrence of unintended canceling sound CS by limiting the increase of the filter coefficient W1.

E. Application of the Present Invention

The present invention is not limited to the above embodiments, but it goes without saying that various configurations can be adopted based on the description contents of this specification. For example, the following structure can be adopted.

<E-1. Application Targets>

In the above embodiments, the ANC apparatuses 24, 24*a* and the AVC apparatus 120 as the active vibration noise control apparatus are applied to the vehicles 10, 10A, 10B (FIGS. 1, 5 and 10). However, it is not limited thereto, for example, from the viewpoint of canceling the target noise (vibration noise VN) or target vibration (engine vibration EV). For example, it is also possible to apply the ANC apparatus 24, 24*a* or the AVC apparatus 120 to other devices (manufacturing device, elevator, escalator, etc.).

In the first embodiment, the vibration noise VN of the engine 40 was taken as the target noise (FIG. 1). However, from the viewpoint of canceling the noise, for example, the present invention is not limited thereto. For example, it is possible to use road noise as the target noise. In that case, the basic configuration of JP 07-104767 A or US 2009/0060217 A1 can be used.

<E-2. Canceling Output Switching Control>

[E-2-1. Cross-Correlation Value Vc]

In the first embodiment, the cross-correlation value Vc of the error signals e1, e2 from the microphones 54*a*, 54*b* (the same type of error detection units) arranged close to each other is calculated, and the canceling sound output switching control (FIGS. 3 and 4). However, it is not limited thereto, for example, from the viewpoint of canceling the vibration noise VN (or target input). For example, the cross-correlation value Vc of the error signals e1, e2 from the microphones 54*a*, 54*b* arranged at a distance from each other may be calculated and used for the canceling sound output switching control. In this case, the transfer function C1^ from the speaker 52 to the microphone 54*a* and the transfer function C1^ from the speaker 52 to the microphone 54*b* can be separately set. The same applies to the acceleration sensors 134*a*, 134*b*, 136*a*, 136*b* of the second embodiment.

Alternatively, in the case of the second embodiment, it is also possible to omit the acceleration sensors 134*b*, 136*b*, calculate cross-correlation values of the acceleration sensors 134*a*, 136*a*, and use them for canceling vibration output switching control. In this case, in order to match the phases of the error signals e21, e31, a delay Z may be set to one or both of the error signals e21, e31 so that the error signals e21, e31 are in phase with each other.

[E-2-2. Limitation to Increase of Canceling Output]

In the first embodiment, when the cross-correlation value Vc falls below the cross-correlation threshold value THvc (S25: NO in FIG. 4), the output of the canceling sound CS is stopped (S28). However, the present invention is not limited thereto, for example, from the viewpoint of limiting the increase in the canceling sound CS (or canceling output) when a disturbance occurs. For example, it is possible to limits the increase in canceling sound CS by setting an upper limit value to the amplitude of canceling sound CS. This also applies to the second to fourth embodiments.

In the first embodiment, the canceling sound output switching control shown in FIG. 4 was performed. However, the present invention is not limited thereto, for example, from the viewpoint of limiting the increase in canceling sound CS (canceling output) in accordance with the cross-correlation value Vc. For example, it is also possible to omit one or more of steps S21, S22, S23, S24, S26 in FIG. 4. This also applies to the second to fourth embodiments (FIGS. 7, 8 and 11).

[E-2-3. Limitation to Calculation of Cross-Correlation Value Vc]

(E-2-3-1. Method of Calculating Cross Correlation Value Vc)

In the first embodiment, equation (1) is used for calculating the cross-correlation value Vc. Alternatively, it is also possible to use the following equation (3).

$$Vc(n) = \frac{1}{N}\sum_{n=1}^{N} Cc(n) \tag{3}$$

In the equation (3), N represents the sampling number, and n represents a specific natural number (for example, any one of 10 to 1000).

(E-2-3-2. Identification of Detected Frequency fsm)

In the first embodiment, the detected frequencies fsm1, fsm2 are specified by performing discrete Fourier transformation on the error signals e1, e2 (S4, S5 in FIG. 3). However, the present invention is not limited thereto, for example, from the viewpoint of detecting the occurrence of a disturbance in accordance with the temporal change of the error signals e1, e2. For example, instead of the discrete Fourier transform, it is also possible to use a discrete cosine transform or a wavelet transform. This also applies to the second to fourth embodiments.

(E-2-3-3. Window Function WF)

In the first embodiment, the window length Lw of the window function WF is made variable according to the rotational speed Ne of the engine 40 (S2, S3 in FIG. 3). However, when focusing on the calculation of the detected frequencies fsm1, fsm2, for example, the present invention is not limited thereto. For example, it is possible to set the window length Lw to a fixed value. Alternatively, a configuration without using the window function WF is also possible. This also applies to the second to fourth embodiments.

(E-2-3-4. Allowable Lowest Frequency f min)

In the first embodiment, when the detection frequency fsm1 or fsm2 of the error signals e1, e2 is lower than the allowable lowest frequency f min (S7: NO in FIG. 3), the calculation of the cross-correlation value Vc is stopped (S9). However, for example, in the case where the detection frequency fsm1 or fsm2 is lower than the allowable lowest frequency f min, the present invention is not limited thereto in view of limiting the output of the canceling sound CS. For example, when the detection frequency fsm1 or fsm2 is lower than the allowable lowest frequency f min, it is also possible to lower the canceling sound CS. Further, for example, paying attention to the calculation itself of the cross-correlation value Vc, the present invention is not limited thereto, and a configuration that does not stop calculating the cross-correlation value Vc, without using the allowable lowest frequency f min is also possible. This also applies to the second to fourth embodiments.

[E-2-5. Adaptive Control]

In the first embodiment, the control signals Sc11, Sc12 are calculated using the error signals e1, e2 from the two microphones 54*a*, 54*b*, respectively, and the control signals Sc11, Sc12 are added to generate the combined control signal Scc1 (FIG. 2). However, it is not limited thereto, for example, from the viewpoint of using the cross-correlation value Vc. For example, the error signal e2 can be used only for calculating the cross-correlation value Vc without calculating the control signal Sc12. In this case, only the adaptive control unit 72a is used, and the adaptive control unit 72b is omitted. This also applies to the second to fourth embodiments.

<E-3. Other>

In the first embodiment, each step is executed in the order shown in FIGS. 3 and 4. However, for example, as long as the purpose of each step can be realized (in other words, when the effect of the present invention can be obtained), the order of each step can be interchanged. For example, step S6 in FIG. 3 can be executed before or in parallel with steps S1 to S5. It is also possible to switch the order of steps S21 to S24 in FIG. 4 or to execute them in parallel. This also applies to the second to fourth embodiments.

In each of the above-described embodiments, there are cases where equal numbers are included or not included in numerical comparison (S7 and the like in FIG. 3). However, for example, if there is no special meaning to include an equal sign or to exclude an equal sign (in other words, in the case where the effect of the present invention is obtained), whether to include an equal sign in numerical comparison can be set arbitrarily.

In this sense, for example, the determination in step S7 of FIG. 3 on whether or not each of the detected frequencies fsm1, fsm2 exceeds the allowable lowest frequency f min (fsm1>f min, fsm2>f min) can be replaced with the determination on whether or not each of the detected frequencies fsm1, fsm2 is equal to or higher than the allowable lowest frequency f min (fsm1≥f min, fsm2≥f min).

F. Explanation of Reference Numerals 10, 10A, 10B . . . vehicle
22 . . . vehicle speed sensor
24, 24a . . . ANC apparatus (active vibration noise control apparatus)
26 . . . air conditioner
30 . . . voice recognition device
40 . . . engine (running drive source)
42 . . . crank pulse sensor (basic signal generating unit)
50, 50a . . . ANC ECU (adaptive control circuit, active vibration noise control circuit)
52 . . . speaker (canceling output generation unit)
54a . . . first microphone (first error detecting unit)
54b . . . second microphone (second error detection unit)
76, 154a, 154b . . . cross-correlation value calculation unit
78, 156 . . . output switching unit (canceling output limiting unit)
80, 160a, 160b . . . adaptive filter
84, 164a, 164b . . . filter coefficient calculation unit
92 . . . window
120 . . . AVC apparatus (active vibration noise control apparatus)
130 . . . AVC ECU (adaptive control circuit, active vibration noise control circuit)
132a, 132b . . . actuator (canceling output generating unit)
134a . . . front side acceleration sensor (first error detecting unit)
134b . . . front side acceleration sensor (second error detecting unit)
136a . . . rear side acceleration sensor (first error detection unit)
136b . . . rear side acceleration sensor (second error detection unit)
180 . . . fan
182 . . . motor
As, AS1, AS2 . . . amplitude of target signal
CNT . . . count value (number)
CS . . . canceling sound
CV . . . canceling vibration
Dec . . . air volume of air conditioner
EV . . . engine vibration (target vibration)
e1, e21, e31 . . . first error signal
e2, e22, e32 . . . second error signal
f min . . . allowable lowest frequency
fsm1, fsm2 . . . frequency of error signal
Lw . . . window length
Ne . . . engine rotation number per unit time (rotational speed)
Pcrk . . . crank pulse (basic signal)
Sc11, Sc12, Sc21, Sc22, Sc31, Sc32 . . . control signal
Scc1, Scc2, Scc3 . . . combined control signal
Sr1, Sr2, Sr1 . . . reference signal
THas, THas2 . . . amplitude threshold value
THcnt . . . count threshold number (number threshold of times)
THdec . . . air volume threshold value
THvc, THvc2 . . . cross-correlation threshold value
THvfm . . . voltage threshold value
THΔVef, THΔVef2 . . . difference threshold value
Ts . . . calculation period (predetermined cycle)
V . . . vehicle speed
Vc, Vc2, Vc3 . . . cross-correlation value
Vfm . . . applied voltage
VN . . . vibration noise (target noise)
WF . . . window function
W1, W2, W3 . . . filter coefficient
ΔVef, ΔVef1, ΔVef2 . . . difference between the effective values of the error signals

What is claim is:

1. An active vibration noise control apparatus comprising:
a basic signal generating unit configured to output a basic signal indicating a target input which is a target noise or a target vibration;
an adaptive control circuit configured to perform an adaptive control on the basic signal to output a control signal;
a canceling output generating unit configured to generate a canceling output as a canceling sound for the target noise or a canceling vibration for the target vibration based on the control signal;
a first error detection unit configured to detect a first error as a difference between the canceling output and the target input at a first evaluation point, and output a first error signal; and
a second error detection unit configured to detect a second error as a difference between the canceling output and the target input at a second evaluation point, and output a second error signal,
wherein the adaptive control circuit comprises:
an adaptive filter configured to generate the control signal on a basis of the basic signal or a reference signal based on the basic signal;
a filter coefficient calculation unit configured to calculate a filter coefficient of the adaptive filter based on the basic signal or the reference signal and at least one of the first error signal and the second error signal;
a cross-correlation value calculation unit configured to calculate a cross-correlation value between the first error signal and the second error signal; and
a canceling output limiting unit configured to determine whether or not the cross-correlation value is smaller than a cross-correlation threshold value, and limit an increase in the canceling output in a case where it is determined that the cross-correlation value is smaller than the cross-correlation threshold value.

2. The active vibration noise control apparatus according to claim 1, wherein the cross-correlation value calculating unit is configured to calculate the cross-correlation value in a case where the frequencies of the first error signal and the second error signal are higher than an allowable lowest frequency, and not to calculate the cross-correlation value in a case where the frequency of the first error signal or the second error signal is lower than the allowable lowest frequency.

3. The active vibration noise control apparatus according to claim 2, wherein the cross-correlation value calculation unit is configured to:
acquire a vehicle speed of the vehicle in which the active vibration noise control apparatus is disposed, and
switch the allowable lowest frequency according to the vehicle speed.

4. The active vibration noise control apparatus according to claim 1, wherein the adaptive control circuit is configured to:
determine whether or not amplitudes of the first error signal and the second error signal are greater than an amplitude threshold value, and
limit an increase in the filter coefficient regardless of whether or not the cross-correlation value exceeds the cross-correlation threshold value in a case where the amplitudes of the first error signal and the second error signal are greater than an amplitude threshold value.

5. The active vibration noise control apparatus according to claim 1, wherein the adaptive control circuit configured to:
calculate a difference between a previous effective value and a current effective value with respect to the first error signal and the second error signal,
determine whether or not the differences between the effective values exceed a difference threshold value, and
limit an increase in the filter coefficient regardless of whether or not the cross-correlation value exceeds the cross-correlation threshold value in a case where the difference between the effective values exceeds the difference threshold value.

6. The active vibration noise control apparatus according to claim 1, wherein the adaptive control circuit is configured to:
acquire an air volume of an air conditioner of a vehicle in which the active vibration noise control apparatus is disposed, and
determine whether or not the air volume exceeds an air volume threshold value, and
limit the increase of the filter coefficient regardless of whether or not the cross-correlation value exceeds the cross-correlation threshold value in a case where the air volume exceeds the air volume threshold value.

7. The active vibration noise control apparatus according to claim 1, wherein the adaptive control circuit is configured to:
specify whether or not a window of a vehicle in which the active vibration noise control apparatus is disposed is in an open state; and
limit an increase in a filter coefficient regardless of whether or not the cross-correlation value exceeds the cross-correlation threshold value in a case where the window is in the open state.

8. The active vibration noise control apparatus according to claim 1, wherein the cross-correlation value calculating unit is configured to:
set a window length of a window function that specifies an extraction portion for calculating the cross-correlation value from the first error signal and the second error signal, and
calculate the cross-correlation value with respect to the extracted portion specified by using the window length,
obtain a rotational speed of a running drive source of a vehicle in which the active vibration noise control apparatus is disposed, and
change the window length of the window function according to the rotational speed of the running drive source.

9. The active vibration noise control apparatus according to claim 8, wherein the cross-correlation value calculation unit is configured to:
estimate a frequency of the first error signal and the second error signal based on the rotational speed of the running drive source, and
set a reciprocal of the estimated frequency as the window length of the window function.

10. The active vibration noise control apparatus according to claim 1, wherein the first error detection unit and the second error detection unit are microphones, and
the adaptive control circuit is configured to:
identify whether or not a voice recognition device of the vehicle where the active vibration noise control apparatus is disposed is performing voice recognition, and
allow an increase in the filter coefficient regardless of whether or not the cross-correlation value falls below the cross-correlation threshold value in a case where the voice recognition device is performing the voice recognition.

11. The active vibration noise control apparatus according to claim 1, wherein the canceling output limiting unit is configured to:
determine whether or not the cross-correlation value falls below the cross-correlation threshold value at every predetermined period while counting a number of times that the cross-correlation value falls below the cross-correlation threshold; and
limit the increase in the canceling output when the number of times reaches the threshold number of times.

12. The active vibration noise control apparatus to claim 1, wherein the adaptive control circuit is configured to:
obtain a voltage to be applied to a motor that drives a fan of an air conditioner of a vehicle in which the active vibration noise control apparatus is disposed;
determine whether the applied voltage exceeds a voltage threshold; and
limit an increase in the filter coefficient regardless of whether the cross-correlation value exceeds the cross-correlation threshold, in a case where the applied voltage exceeds the voltage threshold.

13. An active vibration noise control circuit configured to:
receive a basic signal indicating a target input that is a target noise or a target vibration from a basic signal generating unit;
generate a control signal indicating a canceling output as a canceling sound relative to the target noise or a canceling vibration relative to the target vibration by performing an adaptive control on the basic signal; and
output the control signal to a canceling output generating unit configured to generate the canceling output,
wherein the active vibration noise control circuit comprises:

an adaptive filter configured to generate the control signal on a basis of the basic signal or a reference signal based on the basic signal;
a filter coefficient calculation unit configured to receive, from a first error detection unit, a first error signal indicative of a first error as a difference between the canceling output and the target input at a first evaluation point, receive, from a second error detection unit, a second error signal indicative of a second error as a difference between the canceling output and the target input at a second evaluation point, and calculate a filter coefficient of the adaptive filter based on the reference or basic signal and at least one of the first error signal and the second error signal;
a cross-correlation value calculation unit configured to calculate a cross-correlation value between the first error signal and the second error signal; and
a canceling output limiting unit configured to determine whether or not the cross-correlation value is lower than the cross correlation threshold value, and limit an increase in the canceling output in a case where it is determined that the cross-correlation value is lower than the cross correlation threshold value.

* * * * *